United States Patent
Wang et al.

(10) Patent No.: US 9,154,751 B2
(45) Date of Patent: Oct. 6, 2015

(54) DISPLAY DEVICE FOR THREE-DIMENSIONAL DISPLAY HAVING FIRST AND SECOND COLOR WHEELS

(71) Applicant: DELTA ELECTRONICS, INC., Taoyuan Hsien (TW)

(72) Inventors: Yeong-Feng Wang, Taoyuan Hsien (TW); Meng-Han Liu, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 299 days.

(21) Appl. No.: 13/732,588

(22) Filed: Jan. 2, 2013

(65) Prior Publication Data
US 2014/0055751 A1    Feb. 27, 2014

(30) Foreign Application Priority Data
Aug. 27, 2012 (TW) .............................. 101130962 A

(51) Int. Cl.
    *G03B 21/14*    (2006.01)
    *H04N 13/04*    (2006.01)
    (Continued)

(52) U.S. Cl.
    CPC .............. *H04N 9/3114* (2013.01); *G02B 27/22* (2013.01); *G03B 21/14* (2013.01); *H04N 13/0422* (2013.01); *H04N 13/0429* (2013.01); *H04N 13/0438* (2013.01); *G02B 27/2214* (2013.01); *G03B 21/206* (2013.01); *G03B 21/2093* (2013.01)

(58) Field of Classification Search
    CPC ...... G03B 21/00; G03B 21/005; G03B 21/14; G03B 21/20; G03B 21/2006; G03B 21/206; G03B 21/2093; H04N 9/31; H04N 9/3111; H04N 9/3114; H04N 9/3117; H04N 13/00; H04N 13/0018; H04N 13/0044; H04N 13/04; H04N 13/0422; H04N 13/0427; H04N 13/0429; H04N 13/0431; H04N 13/0434; H04N 13/0438; H04N 13/0459; G02B 27/22; G02B 27/26
    USPC ........ 353/7–8, 84; 348/42, 51, 54–55, 57–58, 348/60; 359/462, 464–465, 475, 477
See application file for complete search history.

(56) References Cited

U.S. PATENT DOCUMENTS 6,795,140 B2 *   9/2004   Shigeta .......................... 349/106
6,874,892 B1 *   4/2005   McDaniel ........................ 353/84
(Continued)

FOREIGN PATENT DOCUMENTS

| CN | 102415094 | 4/2012 |
| TW | 200810521 | 2/2008 |
| TW | 200914876 | 4/2009 |

*Primary Examiner* — Jori S Reilly-Diakun
(74) *Attorney, Agent, or Firm* — Hauptman Ham, LLP

(57) ABSTRACT

A display includes a light source, a first color wheel, a second color wheel, an actuator, a controller, and a light modulator. The light source is for providing a light beam. The first color wheel includes plural primary-color filtering areas, and the second color wheel includes plural left or right eye filtering areas. The actuator rotates the first color wheel and the second color wheel. The controller is for controlling the rotations of the first color wheel and the second color wheel, such that the light beam passing through the first color wheel and the second color wheel is filtered to plural left or right eye primary-color light beams with different spectra. The light modulator is for modulating the left or right primary-color light beams and projecting the modulated left or right primary-color light beams onto a screen to display an image.

20 Claims, 24 Drawing Sheets

(51) Int. Cl.
*H04N 13/00* (2006.01)
*H04N 9/31* (2006.01)
*G02B 27/22* (2006.01)
*G03B 21/20* (2006.01)

(56) References Cited

U.S. PATENT DOCUMENTS

| | | | |
|---|---|---|---|
| 7,283,181 B2* | 10/2007 | Allen et al. | 348/744 |
| 7,914,155 B2* | 3/2011 | Blonde et al. | 353/84 |
| 8,029,139 B2* | 10/2011 | Ellinger et al. | 353/7 |
| 8,047,658 B2 | 11/2011 | Yang | |
| 8,066,377 B1* | 11/2011 | Husak et al. | 353/7 |
| 2002/0109821 A1* | 8/2002 | Huibers et al. | 353/84 |
| 2005/0157274 A1* | 7/2005 | Lin | 353/84 |
| 2005/0212980 A1* | 9/2005 | Miyazaki | 348/744 |
| 2005/0237487 A1* | 10/2005 | Chang | 353/7 |
| 2007/0139618 A1* | 6/2007 | DeCusatis et al. | 353/7 |
| 2007/0195207 A1* | 8/2007 | Wang | 348/744 |
| 2007/0247709 A1* | 10/2007 | Karakawa | 359/464 |
| 2008/0239068 A1* | 10/2008 | Lipton | 348/60 |
| 2013/0201455 A1* | 8/2013 | Endo | 353/7 |
| 2013/0235349 A1* | 9/2013 | Hsu | 353/7 |
| 2013/0242534 A1* | 9/2013 | Pettitt et al. | 362/84 |
| 2013/0271954 A1* | 10/2013 | Li et al. | 362/84 |

* cited by examiner

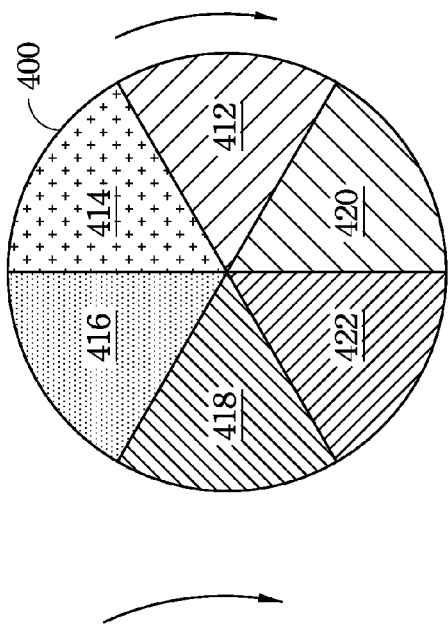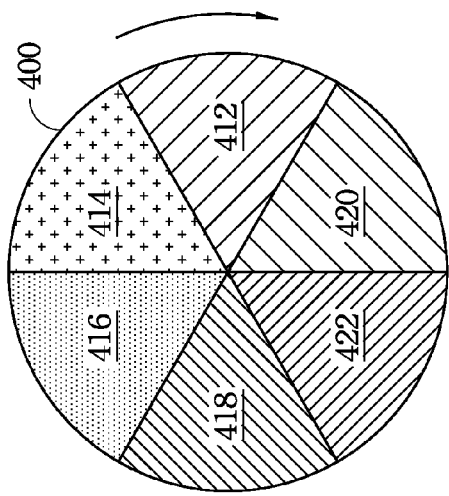
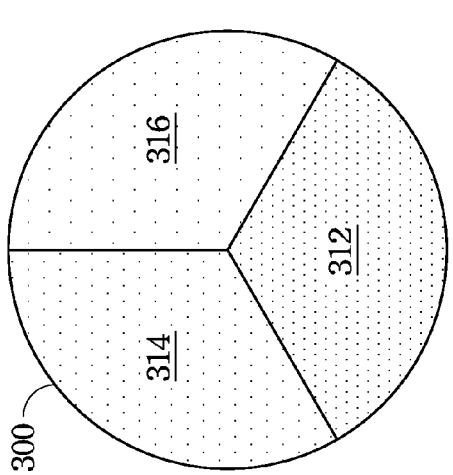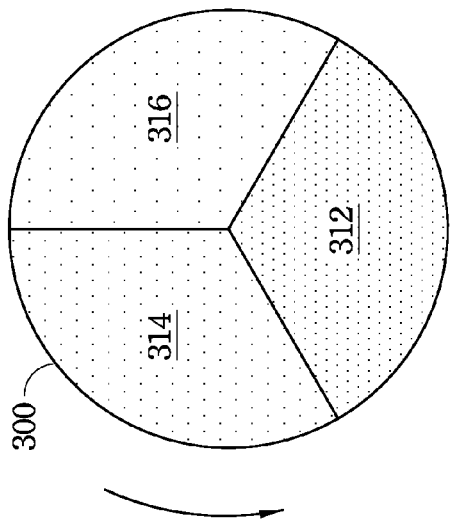
Fig. 5A					Fig. 5B

DISPLAY DEVICE FOR THREE-DIMENSIONAL DISPLAY HAVING FIRST AND SECOND COLOR WHEELS

RELATED APPLICATIONS

This application claims priority to Taiwan Application Ser. No. 101130962, filed Aug. 27, 2012, which is herein incorporated by reference.

BACKGROUND

1. Technical Field

The present disclosure relates to a display. More particularly, the present invention relates to a stereoscopic display.

2. Description of Related Art

Since the parallax of eyes, a stereoscopic display device, in general, provides two images with slightly difference respectively to left and right eyes of a human to generate a stereoscopic image. According to different methods for providing the stereoscopic image, the general stereoscopic display technologies include polarization 3D technology, anaglyphic 3D technology, active shutter 3D technology, and wavelength multiplexing 3D technology.

The general color display device produces various colors in the color space by mixing the additive primary colors, i.e. red (R), green (G), and blue (B). If the bandwidths of R, G, and B are narrow and the color of R, G, and B are pure, the color space formed by R, G, and B can be larger.

The display device using anaglyphic 3D technology distinguishes images of left eye and right eye by using two colors, such as red and blue. Although the cost is cheaper, the device may have problems due to color cast to bring bad image qualities.

The display device using polarization 3D technology distinguishes images of left eye and right eye by using a set of orthogonal lights with linear polarizations or circular polarizations. The device needs to use with special projection screen in case the polarized lights projected to the projection screen may loss their polarization states and become unpolarized. The unpolarized lights on the projection screen will cause double images on the screen, such that the left eye may receive the right eye image, and the right eye may receive the left eye image.

The display device using active shutter 3D technology blocks the visual fields of left and right eye interlacedly, and controls the output image and input image synchronously through the wireless transmitters, infrared ray for example, at the same time. Therefore, the left and the right eye images are displayed interlacedly to achieve stereoscopy display. However, the device needs expansive purchasing cost and the extra energy, i.e. it needs to be charged, to maintain its normal operation.

The basic conception of the wavelength multiplexing stereoscopic system is to distinguish the left and right eye images with two individual sets of primary colors R1, G1, and B1 and R2, G2, and B2 whose frequencies are different from each other. Therefore, if a user wears special glasses, the left image and the right image can be distinguished, and the user also can see more vivid images due to the wider color space the display supplied. In addition, compared to the polarized state, the frequency of light is not so easy to change which means the wavelength multiplexing stereoscopic system doesn't need a projection screen with specific design. On the other hand, the traditional wavelength multiplexing stereoscopic system may cause unnecessary energy and brightness reductions since it provides the same image data to the left and right eye projection systems during two-dimensional display which still provided by R1, G1, B1 and R2, G2, B2 colors individually.

SUMMARY

According to one embodiment of the present invention, a method for displaying includes the following acts of: (The acts are not recited in the sequence in which the acts are performed. That is, unless the sequence of the acts is expressly indicated, the sequence of the acts is interchangeable, and all or part of the acts may be simultaneously, partially simultaneously, or sequentially performed.)

(1) providing a light beam having a light path;

(2) rotating a first color wheel with plural primary-color filtering areas (312'314'316) and a second color wheel with plural left or right eye filtering areas (412'414'416'418'420'422) in a three-dimensional display mode, wherein each of the primary-color filtering areas has a primary-color passband (312 is corresponded to 313, 314 corresponded to 315, 316 corresponded to 317), each of the primary-color filtering areas corresponds to at least two of the left or right eye filtering areas (312(313) corresponded to 412(413), and 414(415), 314(315) corresponded to 416(417), and 418(419), and 316(317) corresponded to 420(421), 422 (423)), each of the left or right eye filtering areas filters out a portion of the primary-color passband of the corresponded primary-color filtering area, the primary-color filtering areas and the corresponding left or right eye filtering areas are disposed in the light path in sequence when the first color wheel and the second color wheel rotate, and the primary-color filtering area and the left or right eye filtering area that are simultaneously in the light path overlap, such that the light beam passing through the first color wheel and the second color wheel is filtered to plural left or right eye primary-color light beams with different spectra;

(3) modulating the left or right eye primary-color light beams and projecting the modulated left or right eye primary-color light beams onto a screen to display an image.

In one or more embodiments, the method optionally further includes the act:

(4) switching the rotations of the first color wheel and the second color wheel in a two-dimensional display mode, such that the left or right eye filtering area disposed in the light path has substantially no filtering effect relative to the primary-color filtering area disposed in the light path at the same time.

In one or more embodiments, the method optionally further includes the act:

(5) adjusting a phase difference between the first color wheel and the second wheel for adjusting a white balance of the image.

In one or more embodiments, one of the at least two of the left or right eye filtering areas filters out fore 50% of the primary-color passband of the corresponded primary-color filtering area, and another of the at least two of the left or right eye filtering areas filters out rear 50% of the primary-color passband of the corresponded primary-color filtering area.

In one or more embodiments, one of the at least two of the left or right eye filtering areas filters out middle 50% of the primary-color passband of the corresponded primary-color filtering area, and another of the at least two of the left or right eye filtering areas filters out fore 25% of the primary-color passband of the corresponded primary-color filtering area and rear 25% of the primary-color passband of the corresponded primary-color filtering area.

In one or more embodiments, the act of rotating the first color wheel and the second color wheel further includes:

(2.1) rotating the first color wheel and the second color wheel along a same axis.

In one or more embodiments, the act of rotating the first color wheel and the second color wheel further includes:

(2.2) rotating the first color wheel and the second color wheel along different axes.

In one or more embodiments, the act of rotating the first color wheel and the second color wheel further includes:

(2.3) rotating the first color wheel and the second color wheel along a same direction.

In one or more embodiments, the act of rotating the first color wheel and the second color wheel further includes:

(2.4) rotating the first color wheel and the second color wheel along different directions.

In one or more embodiments, the light beam passes the first color wheel first and then passes the second color wheel when the light beam passes through the first color wheel and the second color wheel.

In one or more embodiments, the light beam passes the second color wheel first and then passes the first color wheel when the light beam passes through the first color wheel and the second color wheel.

According to one embodiment of the present invention, a display includes a light source, a first color wheel, a second color wheel, an actuator, a controller, and a light modulator. The light source is for providing a light beam having a light path. The first color wheel has plural primary-color filtering areas, and each of the primary-color filtering areas having a primary-color passband. The second color wheel has plural left or right eye filtering areas, and each of the primary-color filtering area corresponding to at least two of the left or right eye filtering areas. Each of the left or right eye filtering areas filters out a portion of the primary-color passband of the corresponded primary-color filtering area. The actuator is for rotating the first color wheel and the second color wheel. The controller is for controlling the rotations of the first color wheel and the second color wheel, such that the primary-color filtering areas and the corresponding left or right eye filtering areas are disposed in the light path in sequence when the first color wheel and the second color wheel rotate, and the primary-color filtering area and the left or right eye filtering area that are simultaneously in the light path overlap, and thus the light beam passing through the first color wheel and the second color wheel is filtered to plural left or right eye primary-color light beams with different spectra. The light modulator is for modulating the left or right primary-color light beams and projecting the modulated left or right primary-color light beams onto a screen to display an image.

In one or more embodiments, the display optionally further includes a switch for switching the rotations of the first color wheel and the second color wheel in a two-dimensional display mode, such that the left or right eye filtering area disposed in the light path has substantially no filtering effect relative to the primary-color filtering area disposed in the light path at the same time.

In one or more embodiments, the display optionally further includes a white balance adjustment module for adjusting a phase difference between the first color wheel and the second wheel to adjust a white balance of the image.

In one or more embodiments, one of the at least two of the left or right eye filtering areas filters out fore 50% of the primary-color passband of the corresponded primary-color filtering area, and another of the at least two of the left or right eye filtering areas filters out rear 50% of the primary-color passband of the corresponded primary-color filtering area.

In one or more embodiments, one of the at least two of the left or right eye filtering areas filters out middle 50% of the primary-color passband of the corresponded primary-color filtering area, and another of the at least two of the left or right eye filtering areas filters out fore 25% of the primary-color passband of the corresponded primary-color filtering area and rear 25% of the primary-color passband of the corresponded primary-color filtering area.

In one or more embodiments, the actuator is for rotating the first color wheel and the second color wheel along a same axis.

In one or more embodiments, the actuator is for rotating the first color wheel and the second color wheel along different axes.

In one or more embodiments, the first color wheel is optionally disposed between the light source and the second color wheel.

In one or more embodiments, the second color wheel is optionally disposed between the light source and the first color wheel.

BRIEF DESCRIPTION OF THE DRAWINGS

FIG. 5A and FIG. 5B show rotational directions of the first color wheel and the second color wheel according to some embodiments of present invention;

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
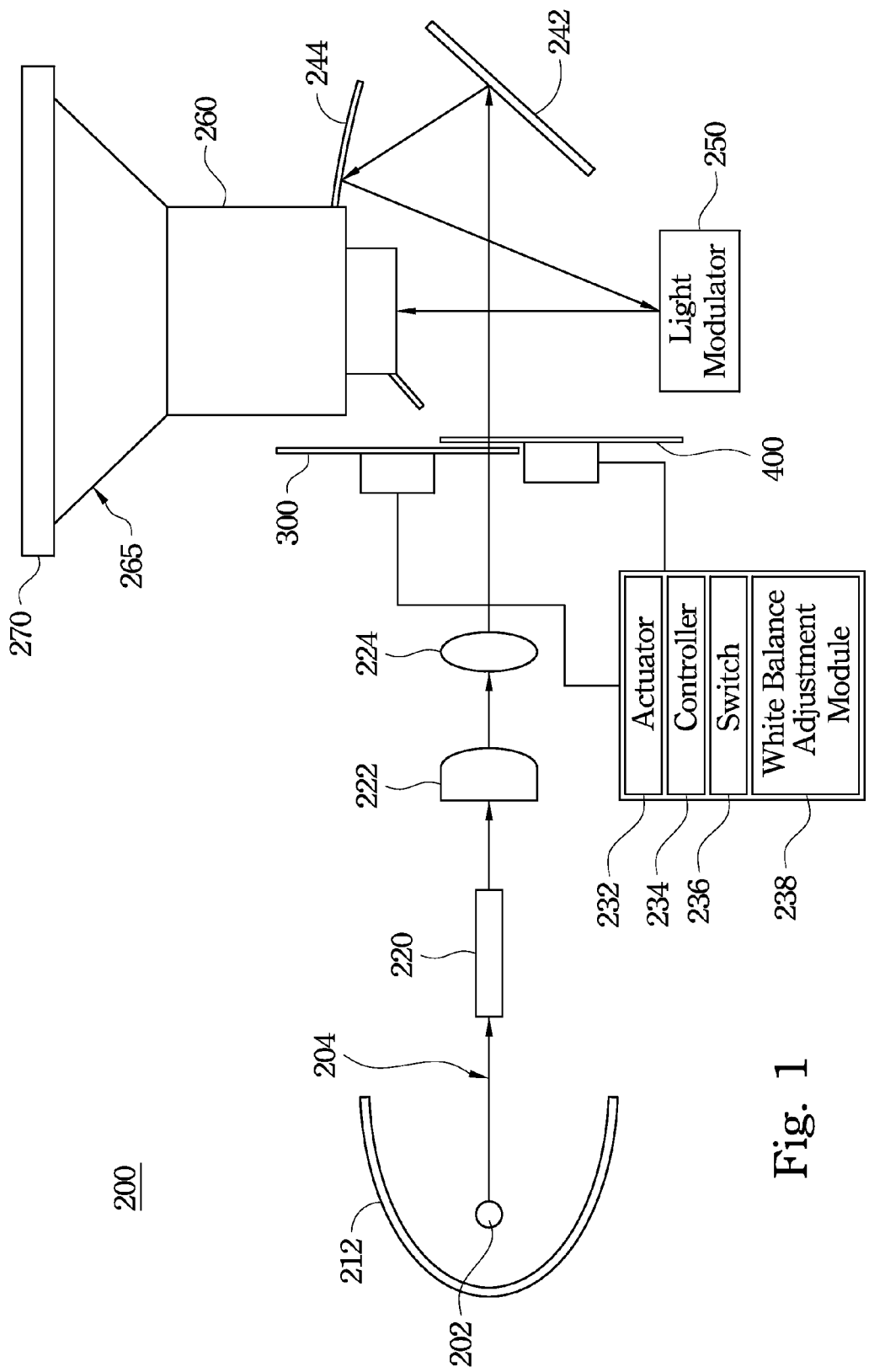
FIG. 1 is a schematic diagram of a display according to one embodiment of the present invention.

FIG. 1 is a schematic diagram of a display 200 according to one embodiment of present invention. As shown in FIG. 1, the display 200 includes a light source 202, a first color wheel 300, a second color wheel 400, an actuator 232, a controller 234, and a light modulator 250. The light source 202 is for providing a light beam 204, and the light source 202 may be a white light source. A portion of the light beam 204 is directly emitted from the light source 202, and another portion of the light beam 204 is reflected by a reflective mirror 212. These portions of the light beam 204 are merged to form the light beam 204 with a light path. In one or more embodiments, a light tunnel 220 and a lens group, such as a first lens 222 and a second lens 224 in this embodiment, may be optionally disposed between the light source 202 and the first color wheel 300/the second color wheel 400 to guide and converse the light beam 204. Therefore, the spot size of the light beam 204 hitting on the first color wheel 300 and the second color wheel 400 can be reduced. It should be understood that the numbers and the positions of the light tunnel 220 and the lens group of FIG. 1 are illustrative only and should not limit the scope of the claimed invention. The person having ordinary skill in the art may design the numbers and the positions of the light tunnel 220 and the lens group according to actual requirements.

Figure 2:
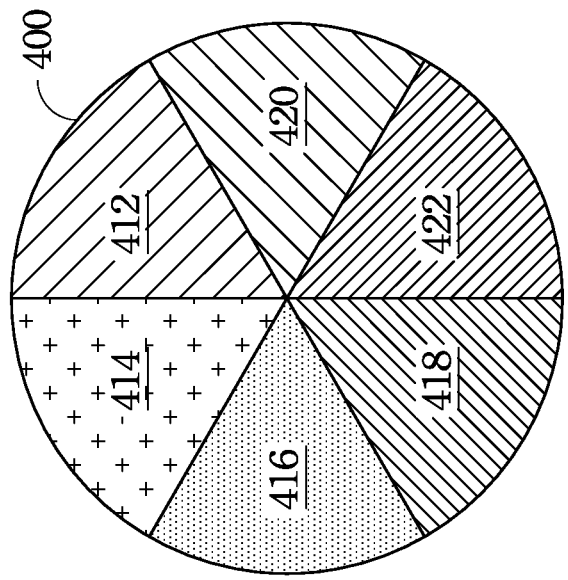
FIG. 2 is a front view of a first color wheel and a second color wheel of FIG. 1.
Figure 2:
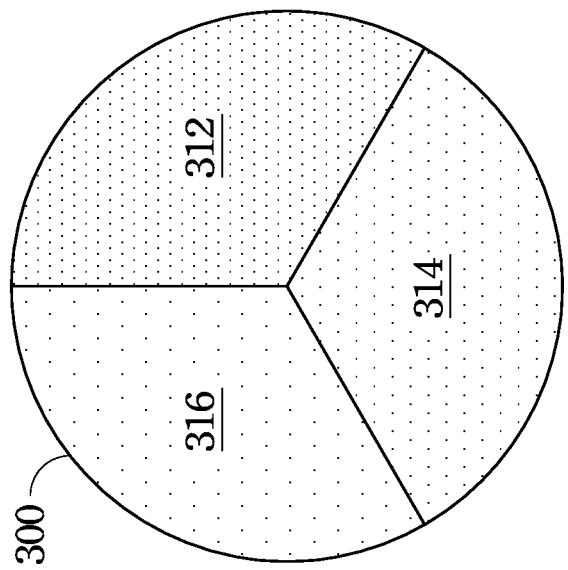
Figure 3:
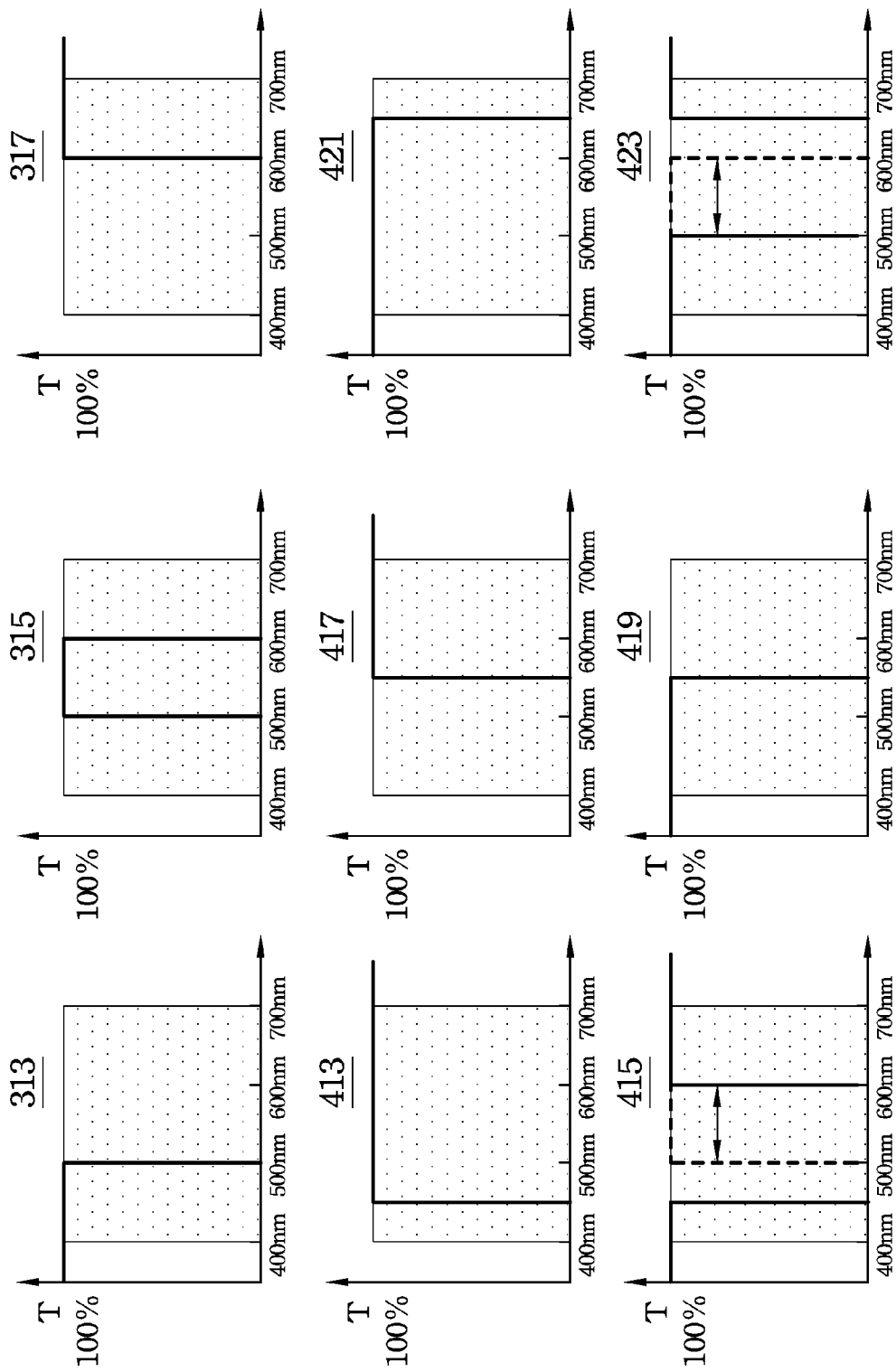
FIG. 3 shows passband diagrams of primary-color filtering areas and left or right eye filtering areas of FIG. 2.

FIG. 2 is a front view of the first color wheel 300 and the second color wheel 400 of FIG. 1. FIG. 3 shows passband diagrams of primary-color filtering areas and left or right eye filtering areas of FIG. 2. As shown in FIG. 2, the first color wheel 300 includes plural primary-color filtering areas radially arranged, and each of the primary-color filtering areas extends from a center of the first color wheel 300 to an edge of the first color wheel 300. The light beam 204 passing through these primary-color filtering areas is filtered to be primary-color light beams with different primary colors for providing colors to projected images. In this embodiment, the primary-color filtering areas may include a blue filtering area 312, a green filtering area 314, and a red filtering area 316. Furthermore, a yellow filtering area may be included if there is a need. It should be understood that the foregoing primary colors are illustrative only and should not limit the scope of the claimed invention. The person having ordinary skill in the art may select the primary colors according to actual requirements.

Primary-color filtering areas have their own primary-color passband for obtaining different primary colors. In this embodiment, the blue filtering area 312 has a blue passband 313 which allows light with a wavelength range below 500 nm to pass through the blue filtering area 312. The green filtering area 314 has a green passband 315 which allows light with a wavelength range between 500 nm and 600 nm to pass through the green filtering area 314. The red filtering area 316 has a red passband 317 which allows light with a wavelength range above 600 nm to pass through the red filtering area 316. It should be understood that the foregoing passbands are illustrative only and should not limit the scope of the claimed invention. The person having ordinary skill in the art may select the passbands according to actual requirements. Furthermore, the wavelength range of visible light, i.e. 400 nm to 700 nm, is depicted as a shadow area in all spectra shown in the drawings for clarity.

The second color wheel 400 has plural left or right eye filtering areas radially arranged, and each of the left or right eye filtering areas extends from a center of the second color wheel 400 to an edge of the second color wheel 400. The left or right eye filtering areas are for dividing the primary-color light beams filtered by the first color wheel 300 into left or right eye primary-color light beams. In order to divide each primary-color light beams into the left or right eye primary-color light beams, each of the primary-color filtering areas of the first color wheel 300 corresponds to at least two of the left or right eye filtering areas of the second color wheel 400, wherein one of the at least two of the left or right eye filtering areas is a left eye filtering area, and the other one of the at least two of the left or right eye filtering areas is a right eye filtering area. In this embodiment, the blue filtering area 312 of the first color wheel 300 corresponds to a left eye blue filtering area 412 and a right eye blue filtering area 414 of the second color wheel 400. The green filtering area 314 of the first color wheel 300 corresponds to a left eye green filtering area 416 and a right eye green filtering area 418 of the second color wheel 400. The red filtering area 316 of the first color wheel 300 corresponds to a right eye red filtering area 422 and a left eye red filtering area 420 of the second color wheel 400. Furthermore, the second color wheel 400 may further include left or right eye yellow filtering areas if the first color wheel 300 includes the yellow filtering area. In this case, the yellow filtering area corresponds to the left or right eye yellow filtering areas.

Each of the left or right eye filtering areas has a left or right eye passband which allows light with a portion of the primary-color passband of the corresponded primary-color filtering area to pass the left or right eye filtering areas. In order to avoid crosstalk between the left and right eye images, the left or right eye passbands of any two of the left or right eye filtering areas of the second color wheel 400 corresponding to the same primary color does not overlap.

In this embodiment, one of the left or right eye filtering areas filters out light with fore 50% of the primary-color passband of the corresponded primary-color filtering area, and another of the left or right eye filtering areas filters out light with rear 50% of the primary-color passband of the corresponded primary-color filtering area. More specifically, the left eye blue filtering area 412 has a left eye blue passband 413 which filters out light with a wavelength range below 450 nm. In other words, the left eye blue passband 413 allows light with a wavelength range above 450 nm to pass through the left eye blue filtering area 412. The right eye blue filtering area 414 has a right eye blue passband 415 which filters out light with a wavelength range between 450 nm and 500 nm or filters out light with a wavelength range between 450 nm and 600 nm. In other words, the right eye blue passband 415 allows light with a wavelength range below 450 nm and above 500 nm to pass through the right eye blue filtering area 414 or allows light with a wavelength range below 450 nm and above 600 nm to pass through the right eye blue filtering area 414. The left eye green filtering area 416 has a left eye green passband 417 which filters out light with a wavelength range below 550 nm. In other words, the left eye green passband 417 allows light with a wavelength range above 550 nm to pass through the left eye green filtering area 416. The right eye green filtering area 418 has a right eye green passband 419 which filters out light with a wavelength range above 550 nm. In other words, the right eye green passband 419 allows light with a wavelength range below 550 nm to pass through the right eye green filtering area. The left eye red filtering area 420 has a left eye red passband 421 which filters out light with a wavelength range above 650 nm. In other words, the left eye red passband 421 allows light with a wavelength range below 650 nm to pass through the left eye red filtering area 420. The right eye red filtering area 422 has a right eye red passband 423 which filters out light with a wavelength range between 600 nm and 650 nm or filters out light with a wavelength range between 500 nm and 650 nm. In other words, the right eye red passband 423 allows light with a wavelength ranges above 650 nm and below 600 nm to pass through the right eye red filtering area 422 or allows light with a wavelength ranges above 650 nm and below 500 nm to pass through the right eye red filtering area 422. However, the passbands are illustrative only and should not limit the scope of the claimed invention. The bandwidths and the wavelengths of the left or right eye passbands are not limited. For example, the bandwidth of the left or right eye passband may be 30% of the corresponded primary-color passband, and they may respectively allow light with the fore 30% and rear 30% of the corresponded primary-color passband to pass therethrough. The person having ordinary skill in the art may select proper bandwidths and wavelengths according to actual requirements. For example, overlap between left and right eye images due to the close relationship between the left eye blue passband 413 and the right eye blue passband 415 should be avoided. In general, the brightness of the provided image goes higher, but the color saturation of the provided image goes lower when the passbands go wider. In contrast, the brightness of the provided image goes lower, but the color saturation of the provided image goes higher when the passbands go narrower.

Figure 4:
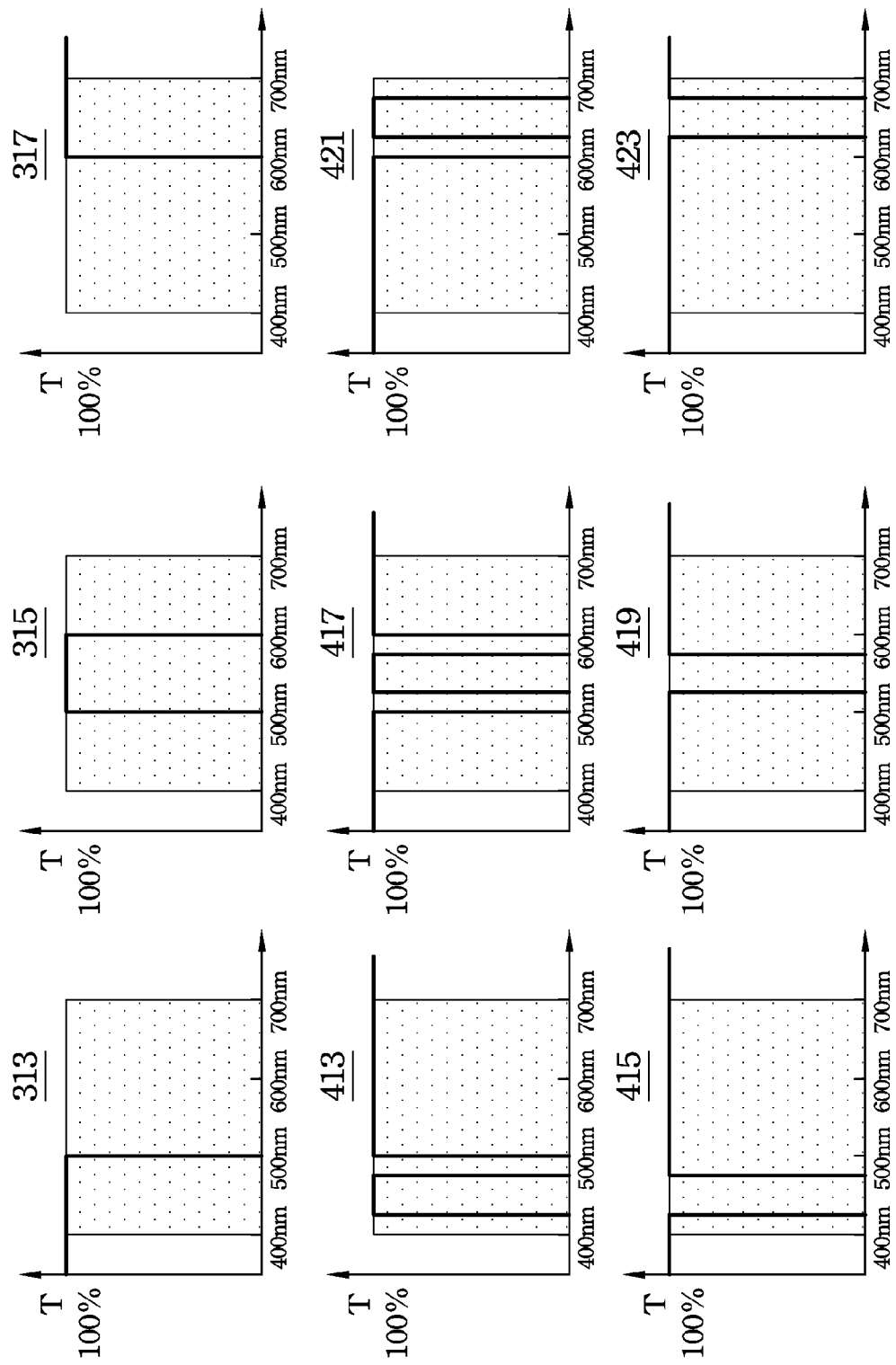
FIG. 4 shows passband diagrams of primary-color filtering areas and left or right eye filtering areas according to another embodiment of present invention.

FIG. 4 shows passband diagrams of the primary-color filtering areas and the left or right eye filtering areas according to another embodiment of present invention. In this embodiment, one of the at least two of the left or right eye filtering areas filters out light with fore 25% of the primary-color passband of the corresponded primary-color filtering area and rear 25% of the primary-color passband of the corresponded primary-color filtering area, and another of the at least two of the left or right eye filtering areas filters out light with middle 50% of the primary-color passband of the corresponded primary-color filtering area.

More specifically, the left eye blue filtering area 412 has a left eye blue passband 413 which filters out light with a wavelength range below 425 nm and between 475 nm and 500 nm. In other words, the left eye blue passband 413 allows light with a wavelength range between 425 nm and 475 nm and above 500 nm to pass through the left eye blue filtering area 412. The right eye blue filtering area 414 has a right eye blue passband 415 which filters out light with a wavelength range between 425 nm and 475 nm. In other words, the right eye blue passband 415 allows light with a wavelength range below 425 nm and above 475 nm to pass through the right eye blue filtering area 414. The left eye green filtering area 416 has a left eye green passband 417 which filters out light with a wavelength range between 500 nm and 525 nm and between 575 nm and 600 nm. In other words, the left eye green band 417 allows light with a wavelength range below 500 nm, between 525 nm and 575 nm, and above 600 nm to pass through the left eye green filtering area 416. The right eye green filtering area 418 has a right eye green passband 419 which filters out light with a wavelength range between 525 nm and 575 nm. In other words, the right eye green passband 419 allows light with a wavelength range below 525 nm and above 575 nm to pass through the right eye green filtering area 418. The left eye red filtering area 420 has a left eye red passband 421 which filters out light with a wavelength range between 600 nm and 625 nm and above 675 nm. In other words, the left eye red band 421 allows light with a wavelength range below 600 nm and between 625 nm and 675 nm to pass through the left eye red filtering area 420. The right eye red filtering area 422 has a right eye red passband 423 which filters out light with a wavelength range between 625 nm and 675 nm. In other words, the right eye red passband 423 allows light with a wavelength range below 625 nm and above 675 nm to pass through the right eye red filtering area 422. In general, since left eye images and right eye images provided by the display with the foregoing configuration own similar color spaces in the color gamut diagram and white balances, the display can provide high quality stereoscopic images.

Reference is made back to FIG. 1. The actuator 232 is for rotating the first color wheel 300 and second color wheel 400, and the controller 234 is for controlling the rotations of the first color wheel 300 and the second color wheel 400 when the display 200 displays images. The actuator 232 may be a motor, and the controller 234 may be a control chip.

In a three-dimensional display mode, the controller 234 may control the rotations of the first color wheel 300 and the second color wheel 400, such that the primary-color filtering areas and the corresponding left or right eye filtering areas are disposed in the light path in sequence when the first color wheel 300 and the second color wheel 400 rotate. The primary-color filtering area and the left or right eye filtering area that are simultaneously in the light path overlap for filtering the light beam 204 passing through the first color wheel 300 and the second color wheel 400 to plural left or right eye primary-color light beams with different spectra.

As shown in FIG. 2, the primary-color filtering areas of the first color wheel 300 include the blue filtering area 312, the green filtering area 314, and the red filtering area 316 arranged in a clockwise sequence. The left or right eye filtering areas of the second color wheel 400 include the left eye blue filtering area 412, the right eye blue filtering area 414, the left eye green filtering area 416, the right eye green filtering area 418, the right eye red filtering area 422, and the left eye red filtering area 420 arranged in a counterclockwise sequence. In this embodiment, the first color wheel 300 rotates counterclockwise, and the second color wheel 400 rotates clockwise in the three-dimensional display mode. On the other hand, the first color wheel 300 rotates clockwise, and the second color wheel 400 rotates counterclockwise in a two-dimensional display mode. The detail steps of filtering the light beam 204 will be described in the following.

It should be understood that the foregoing arrangements of the primary-color filtering areas of the first color wheel 300 and the left or right eye filtering areas of the second color wheel 400 are illustrative only. In one or more embodiments, other arrangements of the primary-color filtering areas and the left or right eye filtering areas are available as long as the rotations of the first color wheel 300 and the second color wheel 400 are adjusted. For example, in one or more embodiments, the primary-color filtering areas of the first color wheel 300 may include the blue filtering area 312, the green filtering area 314, and the red filtering area 316 arranged in a clockwise sequence. The left or right eye filtering areas of the second color wheel 400 may include the left eye blue filtering area 412, the right eye blue filtering area 414, the left eye red filtering area 420, the right eye red filtering area 422, the left eye green filtering area 416, and right eye green filtering area 418 arranged in a clockwise sequence. In this embodiment, the first color wheel 300 rotates clockwise, and the second color wheel 400 rotates counterclockwise in the three-dimensional display mode. On the other hand, the first color wheel 300 rotates clockwise, and the second color wheel 400 rotates counterclockwise with a phase delay or a phase lead in the two-dimensional display mode.

The primary-color filtering areas of the first color wheel 300 and the left or right eye filtering areas of the second color wheel 400 may be arranged according to a time sequence for convenience, such that the rotation directions and the rotation rates of the first color wheel 300 and the second color wheel 400 can be fixed when the first color wheel 300 and the second color wheel 400 rotate.

FIG. 5A and FIG. 5B show rotational directions of the first color wheel 300 and the second color wheel 400 according to some embodiments of present invention. The rotation directions of the first color wheel 300 and the second color wheel 400 are not limited as aforementioned. The controller 234 may rotate the first color wheel 300 and the second color wheel 400 along the same direction as shown in FIG. 5A or rotate the first color wheel 300 and the second color wheel 400 along different directions as shown in FIG. 5B depending on different situations.

Figure 6:
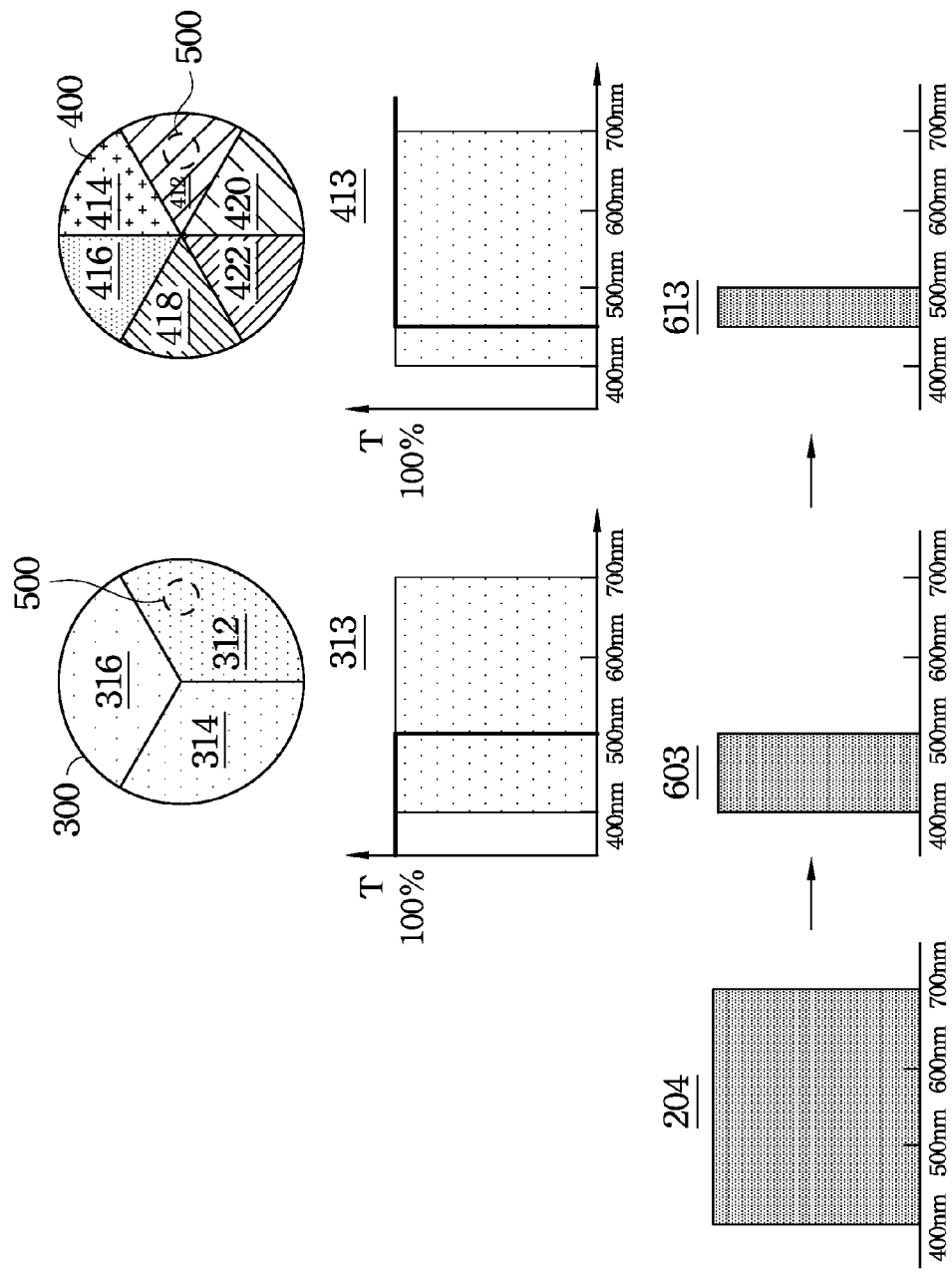
FIG. 6 to FIG. 11 show a filtering process using the first color wheel and the second color wheel of FIG. 1 in a three-dimensional display mode.

FIG. 6 to FIG. 11 show a filtering process using the first color wheel 300 and the second color wheel 400 of FIG. 1 in the three-dimensional display mode. As shown in FIG. 6, the actuator 232 and the controller 234 may rotate the first color wheel 300 to dispose the blue filtering area 312 in the light path 500 and simultaneously rotate the second color wheel 400 to dispose the left eye blue filtering area 412 in the light path 500. The light beam 204 is filtered to be a blue light beam with a blue wavelength range 603 after passing through the blue filtering area 312. The blue light beam with the blue wavelength range 603 is further filtered to be a left eye blue light beam with a left eye blue wavelength range 613 after passing through the left eye blue filtering area 412.

Figure 7:
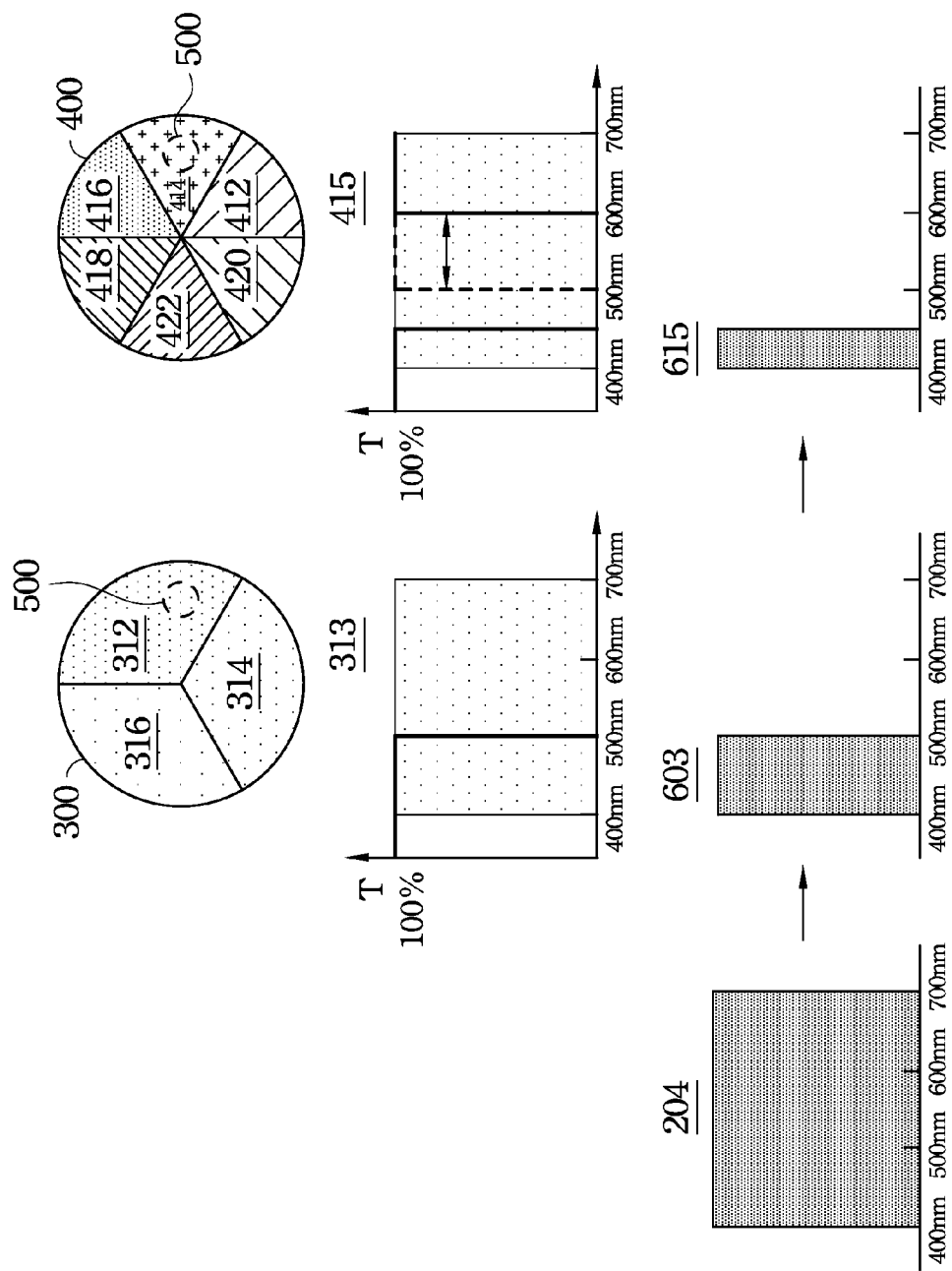

In the next time period, as shown in FIG. 7, the actuator 232 and the controller 234 may rotate the first color wheel 300 counterclockwise to maintain the blue filtering area 312 in the light path 500 and simultaneously rotate the second color wheel 400 clockwise to dispose the right eye blue filtering area 414 in the light path 500. The light beam 204 is filtered to be the blue light beam with the blue wavelength range 603 after passing through the blue filtering area 312. The blue light beam with the blue wavelength range 603 is further filtered to be a right eye blue light beam with a right eye blue wavelength range 615 after passing through the right eye blue filtering area 414.

Figure 8:
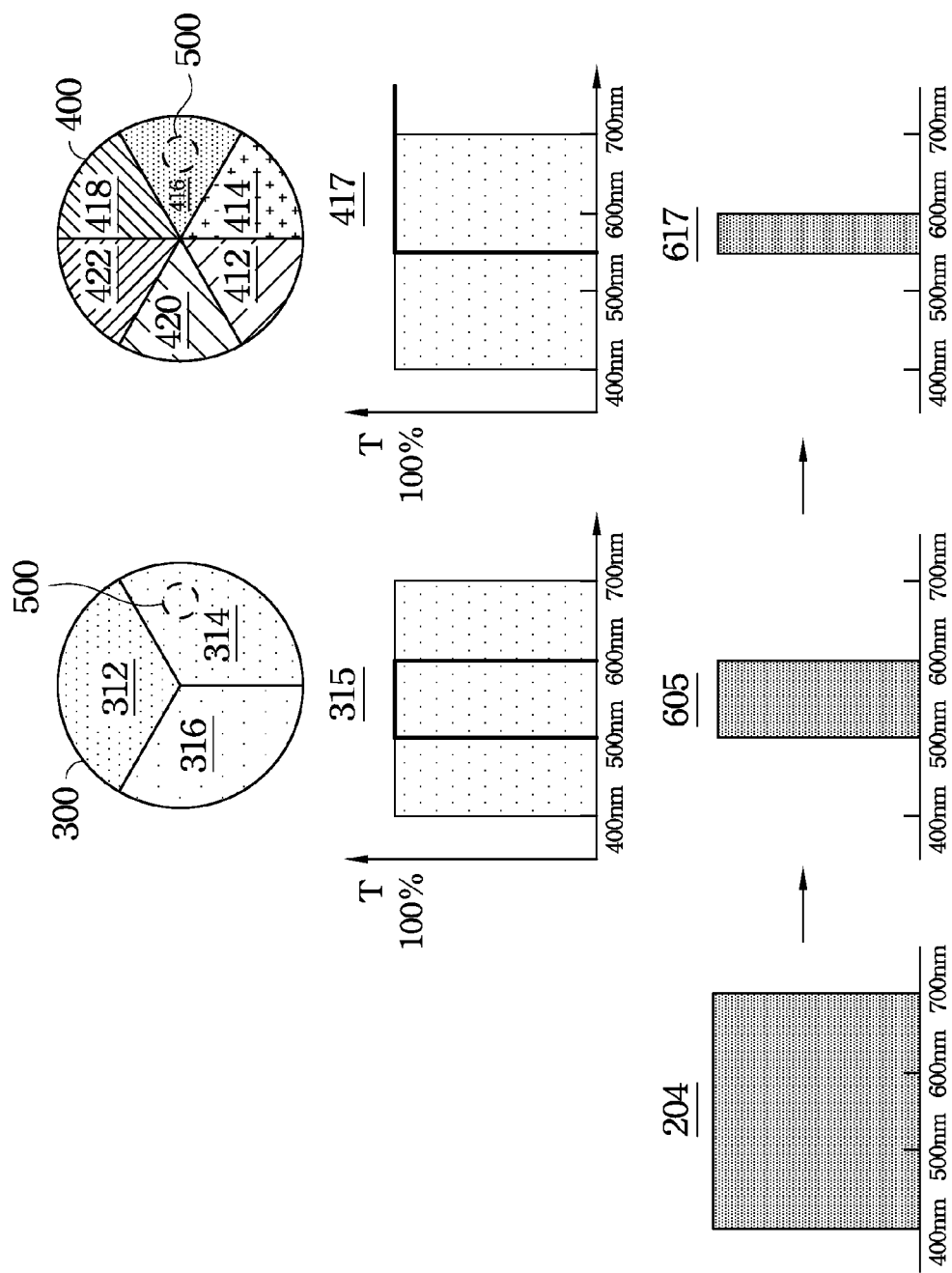

In the next time period, as shown in FIG. 8, the actuator 232 and the controller 234 may rotate the first color wheel 300 counterclockwise to dispose the green filtering area 314 in the light path 500 and simultaneously rotate the second color wheel 400 clockwise to dispose the left eye green filtering area 416 in the light path 500. The light beam 204 is filtered to be a green light beam with a green wavelength range 605 after passing through the green filtering area 314. The green light beam with the green wavelength range 605 is further filtered to be a left eye green light beam with a left eye green wavelength range 617 after passing through the left eye green filtering area 416.

Figure 9:
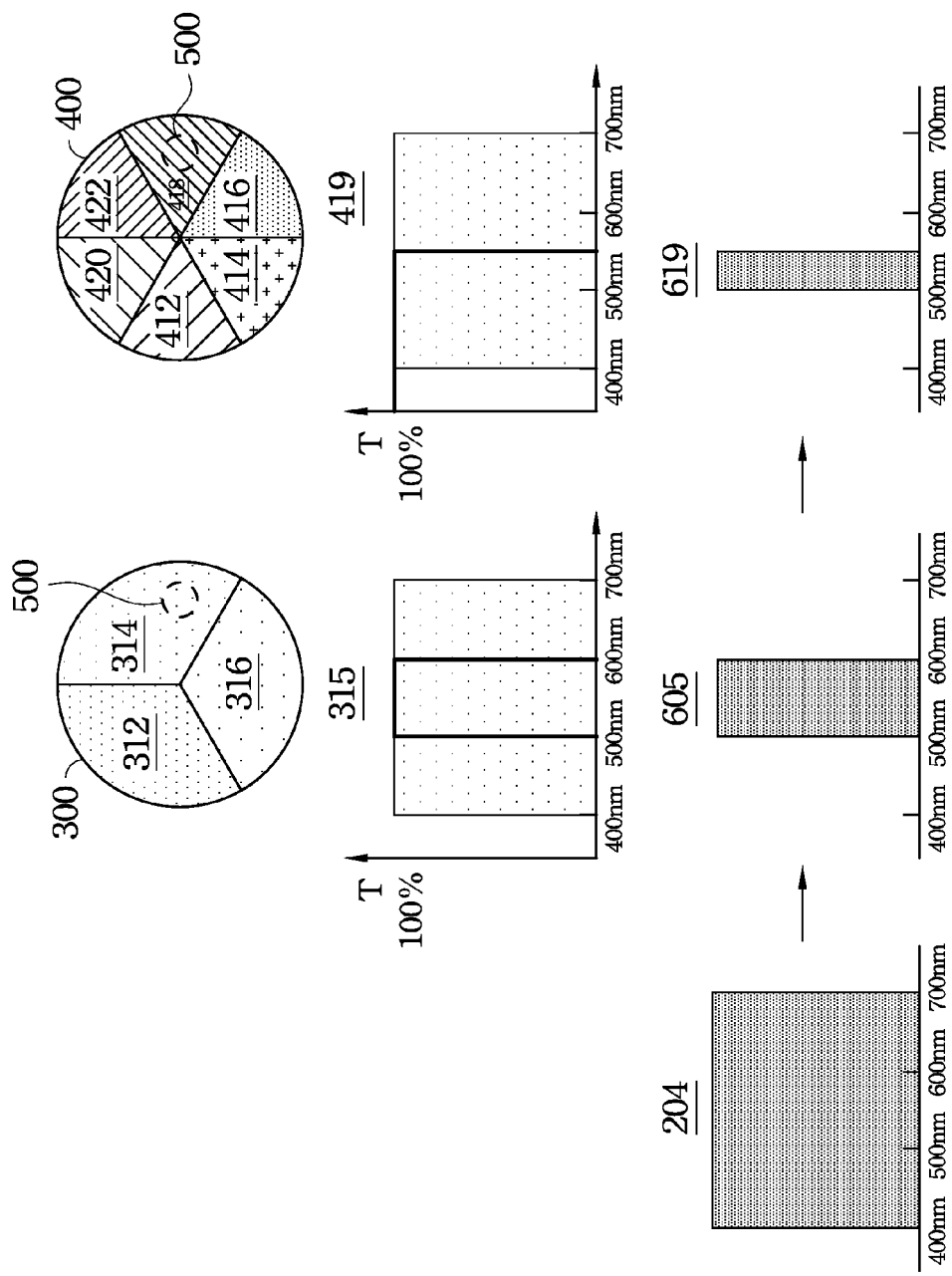

In the next time period, as shown in FIG. 9, the actuator 232 and the controller 234 may rotate the first color wheel 300 counterclockwise to maintain the green filtering area 314 in the light path 500 and simultaneously rotate the second color wheel 400 clockwise to dispose the right eye green filtering area 418 in the light path 500. The light beam 204 is filtered to be the green light beam with the green wavelength range 605 after passing through the green filtering area 314. The green light beam with the green wavelength range 605 is further filtered to be a right eye green light beam with a right eye green wavelength range 619 after passing through the right eye green filtering area 418.

Figure 10:
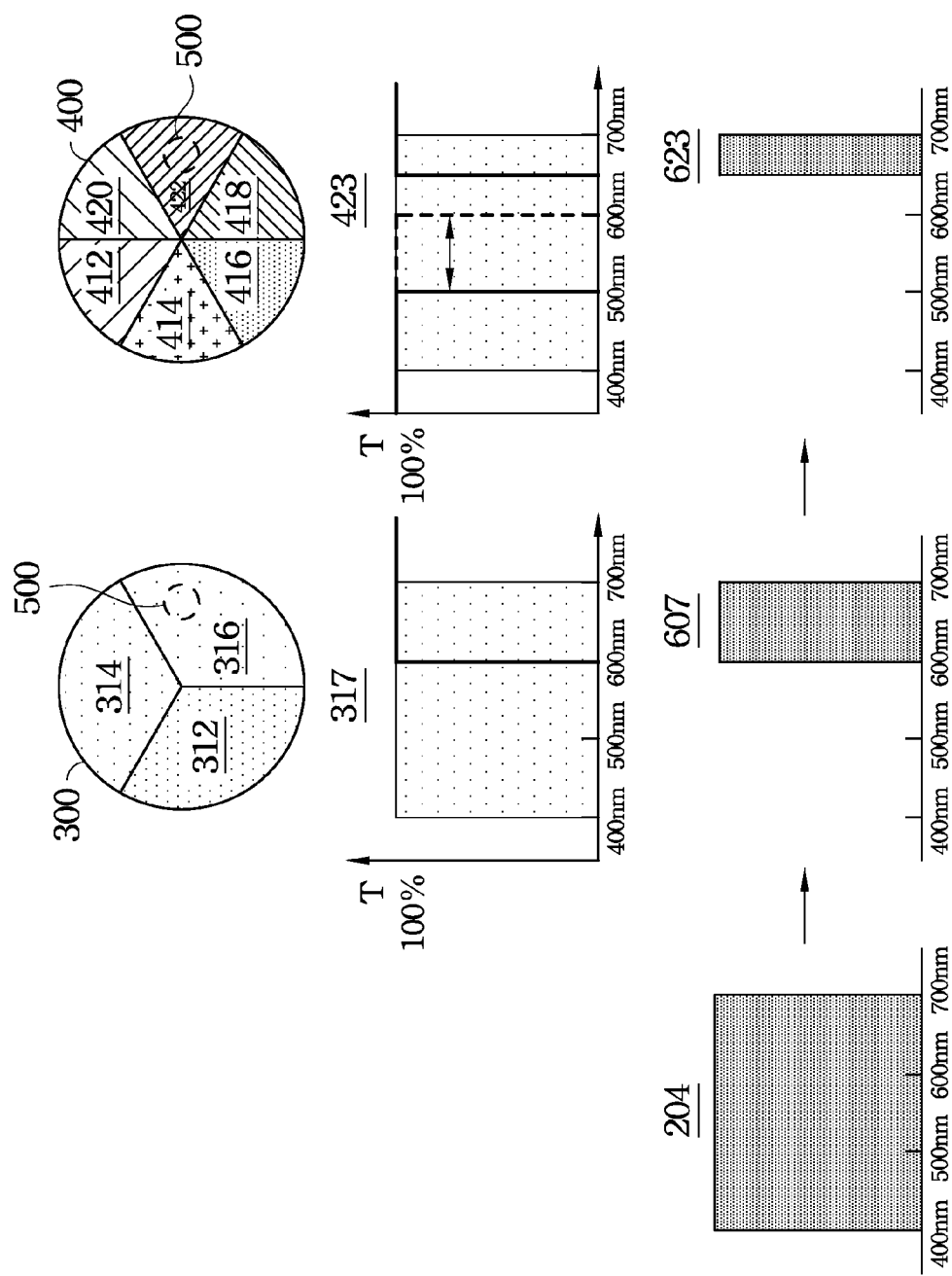

In the next time period, as shown in FIG. 10, the actuator 232 and the controller 234 may rotate the first color wheel 300 counterclockwise to dispose the red filtering area 316 in the light path 500 and simultaneously rotate the second color wheel 400 clockwise to dispose the right eye red filtering area 422 in the light path 500. The light beam 204 is filtered to be a red light beam with a red wavelength range 607 after passing through the red filtering area 316.

The red light beam with the red wavelength range 607 is further filtered to be a right eye red light beam with a right eye red wavelength range 623 after passing through the right eye red filtering area 422.

Figure 11:
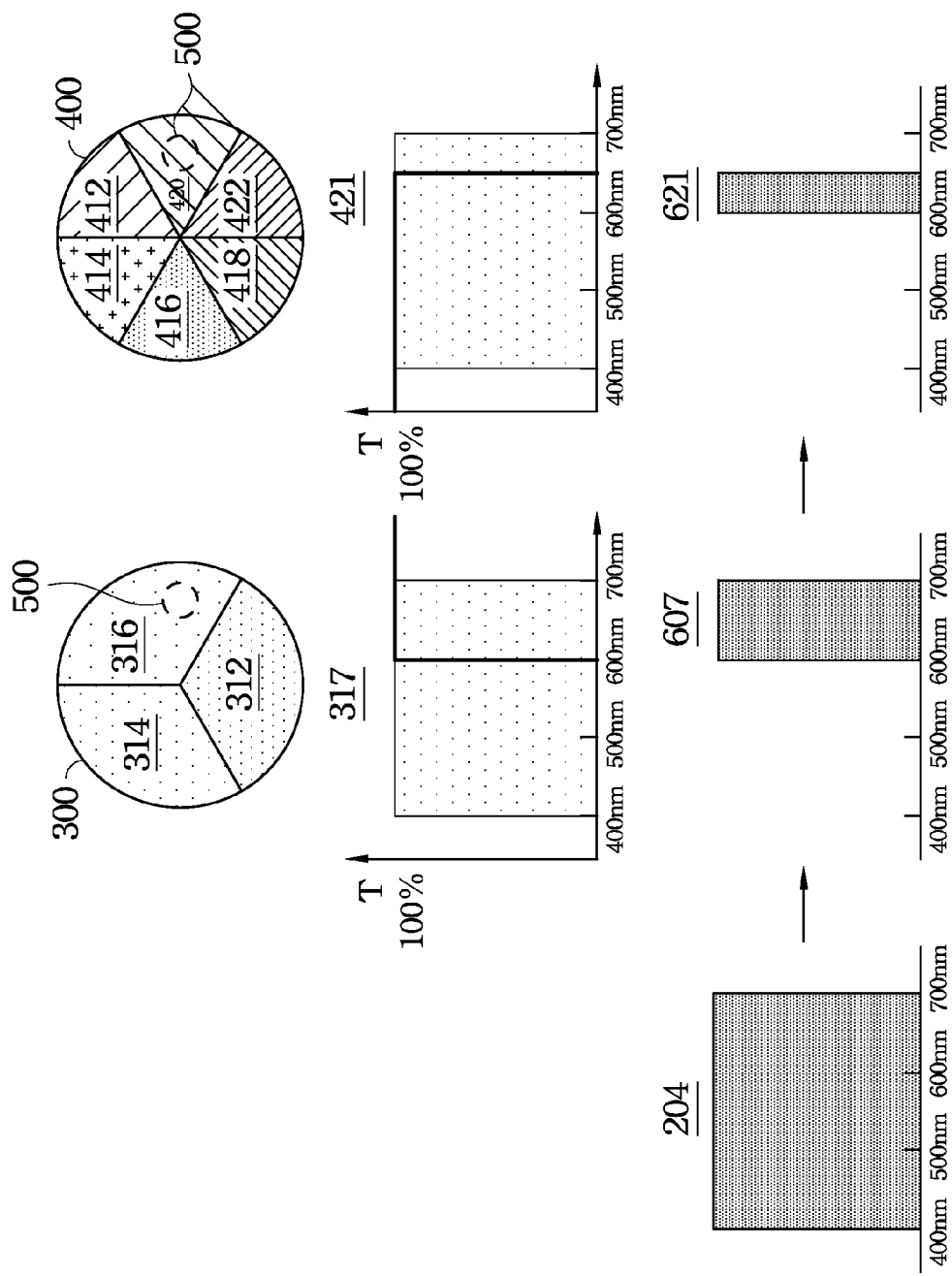

In the next time period, as shown in FIG. 11, the actuator 232 and the controller 234 may rotate the first color wheel 300 counterclockwise to maintain the red filtering area 316 in the light path 500 and simultaneously rotate the second color wheel 400 clockwise to dispose the left eye red filtering area 420 in the light path 500. The light beam 204 is filtered to be the red light beam with the red wavelength range 607 after passing through the red filtering area 316. The red light beam with the red wavelength range 607 is further filtered to be a left eye red light beam with a left eye red wavelength range 621 after passing through the left eye red filtering area 420.

Figure 12A:
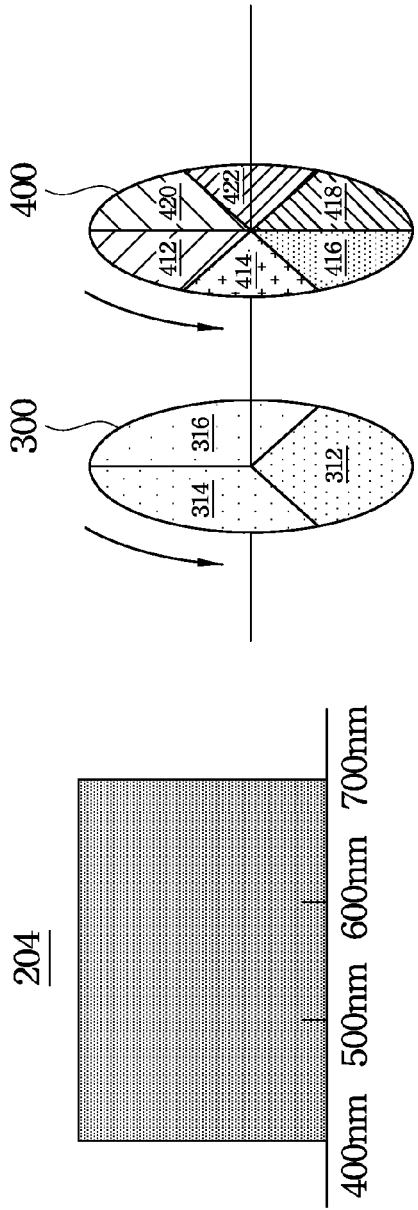
FIG. 12A shows a sequence of the first color wheel and the second color wheel according to one embodiment of present invention.
Figure 12B:
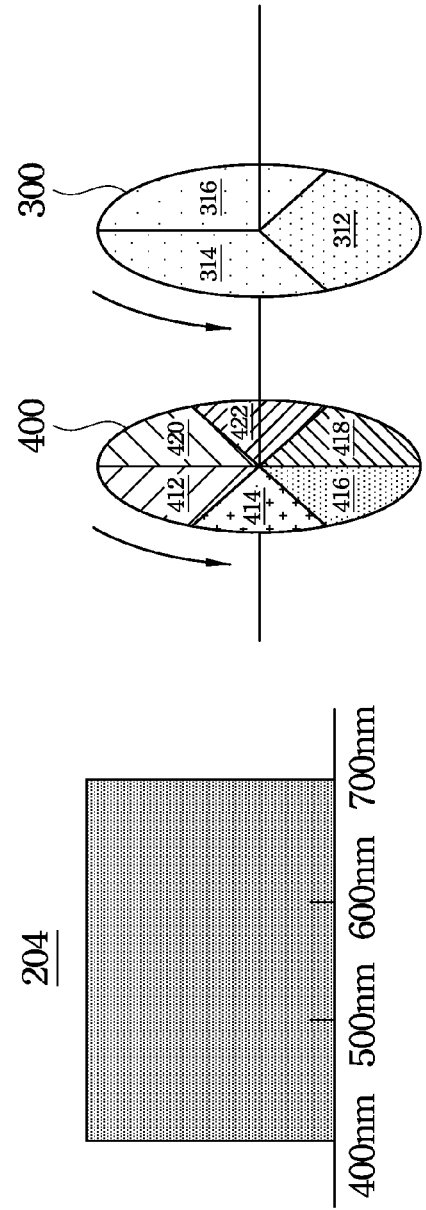
FIG. 12B shows a sequence of the first color wheel and the second color wheel according to another embodiment of present invention.

FIG. 12A shows a sequence of the first color wheel 300 and the second color wheel 400 according to one embodiment of present invention. FIG. 12B shows a sequence of the first color wheel 300 and the second color wheel 400 according to another embodiment of present invention. According to the foregoing embodiment, the light beam 204 passes through the first color wheel 300 first and then passes through the second color wheel 400, i.e. the first color wheel 300 is disposed between the light source 202 and the second color wheel 400 as shown in FIG. 12A, when the light beam 204 passes through the first color wheel 300 and the second color wheel 400. However, this sequence may be changed. For example, the light beam 204 may pass through the second color wheel 400 first and then pass through the first color wheel 300, i.e. the second color wheel 400 is disposed between the light source 202 and the first color wheel 300 as shown in FIG. 12B, when the light beam 204 passes through the first color wheel 300 and the second color wheel 400. Therefore, the person having ordinary skill in the art may design the sequence of the first color wheel 300 and the second color wheel 400 according to actual requirements.

Reference is made back to FIG. 1. The light beam 204 can be filtered to be the left or right eye primary-color light beams with different spectra in sequence by following the steps from FIG. 6 to FIG. 11. The left or right eye primary-color light beams are then guided to the light modulator 250. The light modulator 250 may be a digital micromirror device (DMD) which modulates the left or right eye primary-color light beams to left or right eye primary-color images respectively according to different image data. The left or right eye primary-color images can pass through the projection element 260 and then be projected onto the screen 270 to show stereoscopic images, i.e. the image 265.

Figure 13:
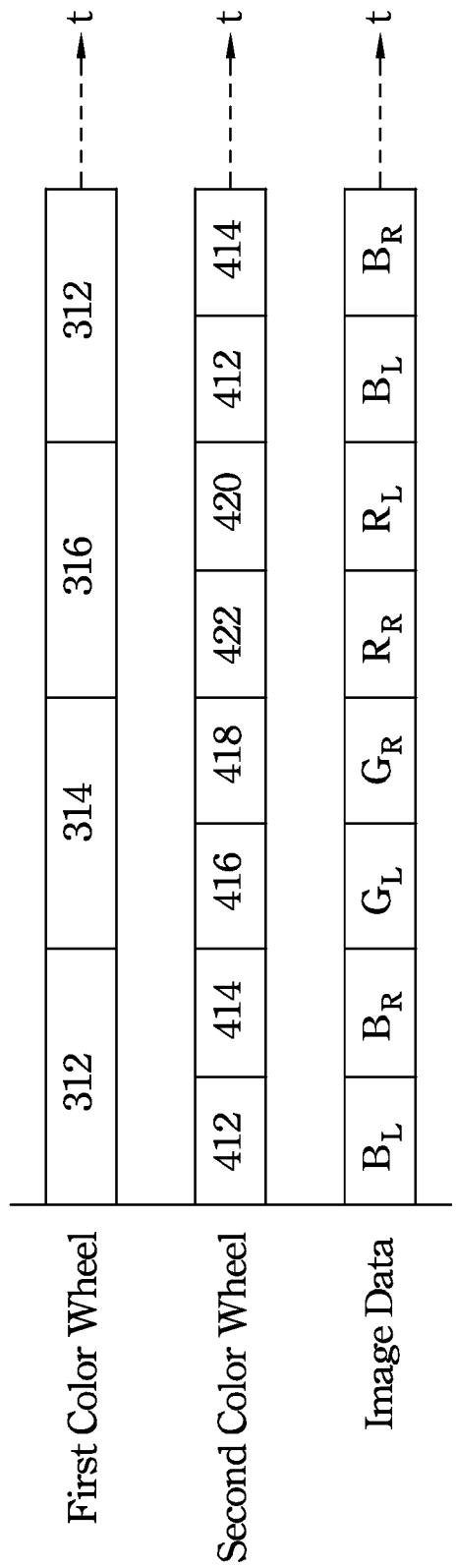
FIG. 13 is an operation sequence diagram of the first color wheel, the second color wheel, and a light modulator of FIG. 1 in the three-dimensional display mode.

FIG. 13 is an operation sequence diagram of the first color wheel 300, the second color wheel 400, and the light modulator 250 of FIG. 1 in the three-dimensional display mode. As shown in FIG. 13, the light beam 204 is filtered to be the left eye blue light beam after passing through the blue filtering area 312 of the first color wheel 300 and the left eye blue filtering area 412 of the second color wheel 400. Then, the light modulator 250 modulates the left eye blue light beam to be the left eye blue image according to the left eye blue image data $B_L$. In the next time period, the light beam 204 is filtered to be the right eye blue light beam after passing through the blue filtering area 312 of the first color wheel 300 and the right eye blue filtering area 414 of the second color wheel 400. Then, the light modulator 250 modulates the right eye blue light beam to be the right eye blue image according to the right eye blue image data $B_R$. In the next time period, the light beam 204 is filtered to be the left eye green light beam after passing through the green filtering area 314 of the first color wheel 300 and the left eye green filtering area 416 of the second color wheel 400. Then, the light modulator 250 modulates the left eye green light beam to be the left eye green image according to the left eye green image data $G_L$. In the next time period, the light beam 204 is filtered to be the right eye green light beam after passing through the green filtering area 314 of the first color wheel 300 and the right eye green filtering area 418 of the second color wheel 400. Then, the light modulator 250 modulates the right eye green light beam to be the right eye green image according to the right eye green image data $G_R$. In the next time period, the light beam 204 is filtered to be the right eye red light beam after passing through the red filtering area 316 of the first color wheel 300 and the right eye red filtering area 422 of the second color wheel 400. Then, the light modulator 250 modulates the right eye red light beam to be the right eye red image according to the right eye red image data $R_R$. In the next time period, the light beam 204 is filtered to be the left eye red light beam after passing through the red filtering area 316 of the first color wheel 300 and the left eye red filtering area 420 of the second color wheel 400. Then, the light modulator 250 modulates the left eye red light beam to be the left eye red image according to the left eye red image data $R_L$.

Therefore, as long as the first color wheel 300 and the second color wheel 400 rotate repeatedly as mentioned above with specific image data modulated by the light modulator 250, the display 200 will project left or right eye primary-color images continuously.

In summary, the display 200 in this embodiment can achieve stereoscopy as long as the first color wheel 300 and the second color wheel 400 cooperate. The display 200 has smaller size and does not have the images alignment problem compared to the traditional device using two projectors to provide left and right eye images. In addition, since the number of coating layers is less compared to the traditional wavelength multiplexing system, the cost can be down efficiently.

FIG. 14 to FIG. 19 show a filtering process using the first color wheel 300 and the second color wheel 400 of FIG. 1 in the two-dimensional display mode. As shown in FIG. 1, the display 200 further includes a switch 236 for switching the rotations of the first color wheel 300 and the second color wheel 400 to switch the display 200 from the three-dimensional display mode to the two-dimensional display mode. As shown in FIG. 14 to FIG. 19, when the display 200 is switched from the three-dimensional display mode to the two-dimensional display mode, the switch 236 switches the rotations of the first color wheel 300 and the second color wheel 400, such that the left or right eye filtering area disposed in the light path 500 has substantially no filtering effect relative to the primary-color filtering area disposed in the light path 500 at the same time. Switching the rotations of the first color wheel 300 and the second color wheel 400 may mean: rotating the second color wheel 400 with a phase delay relative to the first color wheel 300, rotating the second color wheel 400 with a phase lead relative to the first color wheel 300, switching the rotational directions of the first color wheel 300 and the second color wheel 400, or any combinations thereof.

Figure 14:
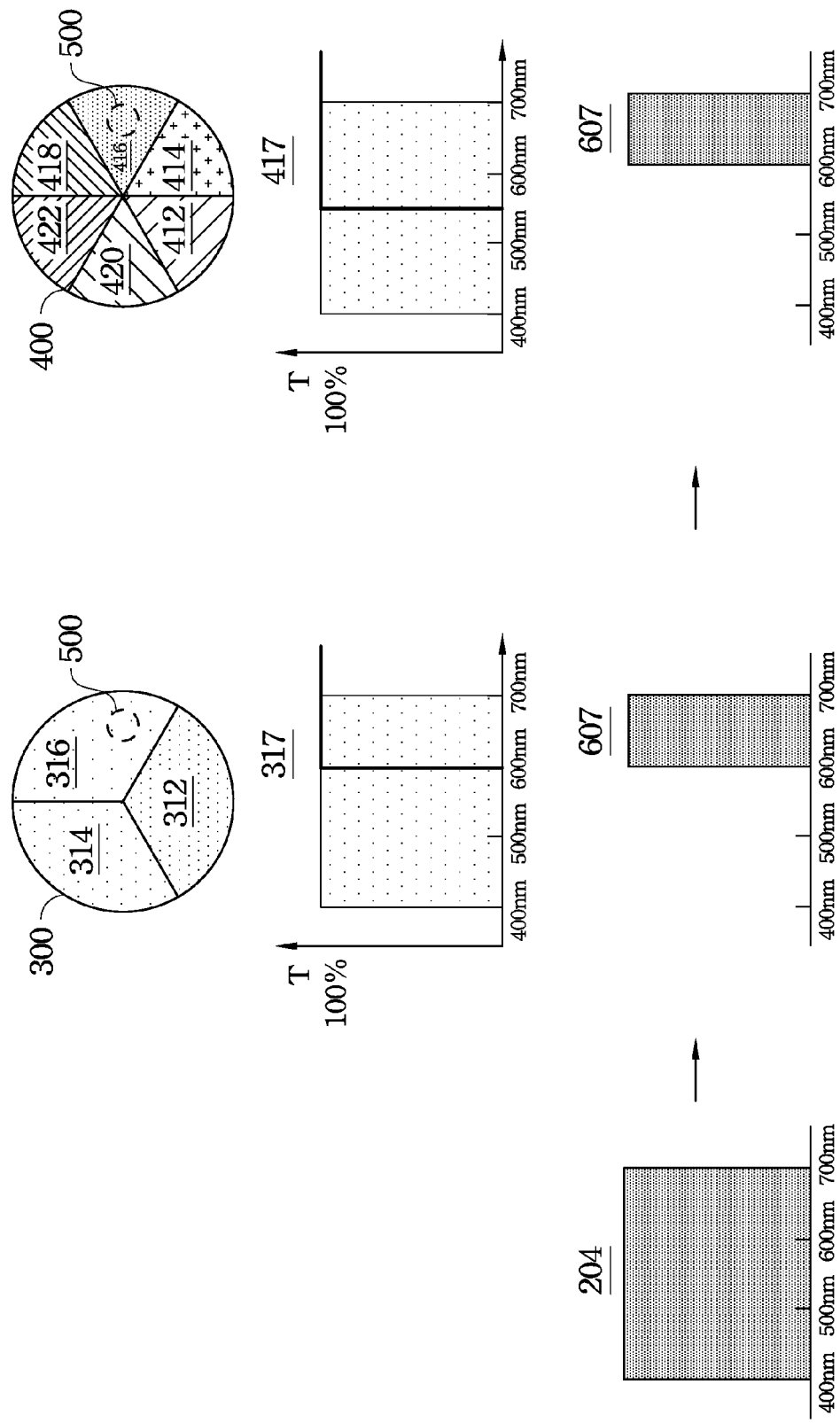
FIG. 14 to FIG. 19 show a filtering process using the first color wheel and the second color wheel of FIG. 1 in a two-dimensional display mode.

As shown in FIG. 14, in this embodiment, the left eye green filtering area 416 is simultaneously disposed in the light path 500 when the front segment of the red filtering area 316 is disposed in the light path 500. Therefore, the light beam 204 is filtered to be the red light beam with the red wavelength range 607 after passing through the red filtering area 316. Then, the red light beam with the red wavelength range 607 passes through the left eye green filtering area 416 of the second color wheel 400 and remains its red wavelength range 607 since the left eye green filtering area 416 has substantially no filtering effect to the red light beam with the red wavelength range 607.

Figure 15:
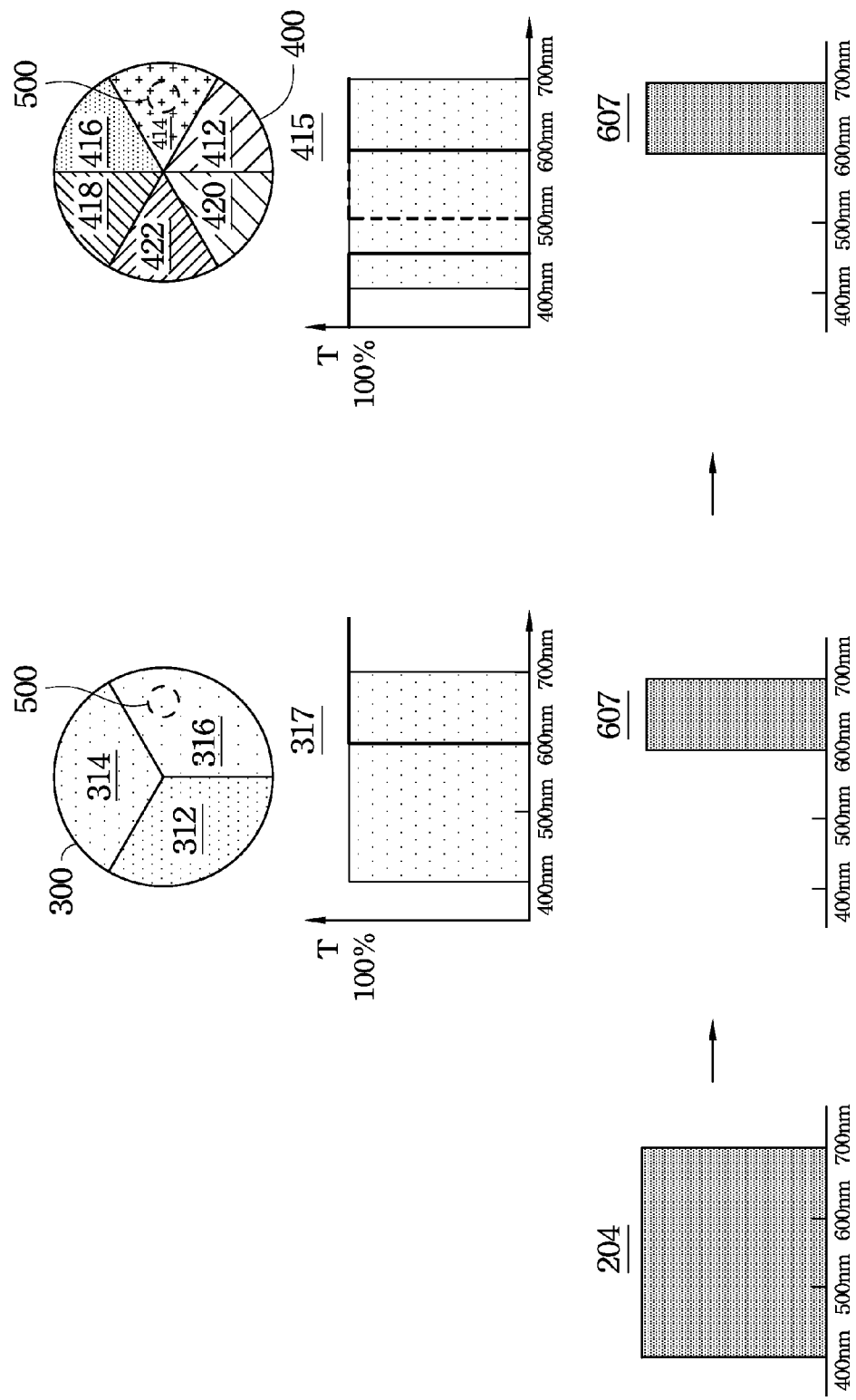

In the next time period, as shown in FIG. 15, the right eye blue filtering area 414 is simultaneously disposed in the light path 500 when the rear segment of the red filtering area 316 is disposed in the light path 500. Therefore, the light beam 204 is filtered to be the red light beam with the red wavelength range 607 after passing through the red filtering area 316. Then, the red light beam with the red wavelength range 607 passes through the right eye blue filtering area 414 of the second color wheel 400 and remains its red wavelength range 607 since the right eye blue filtering area 414 has substantially no filtering effect to the red light beam with the red wavelength range 607.

Figure 16:
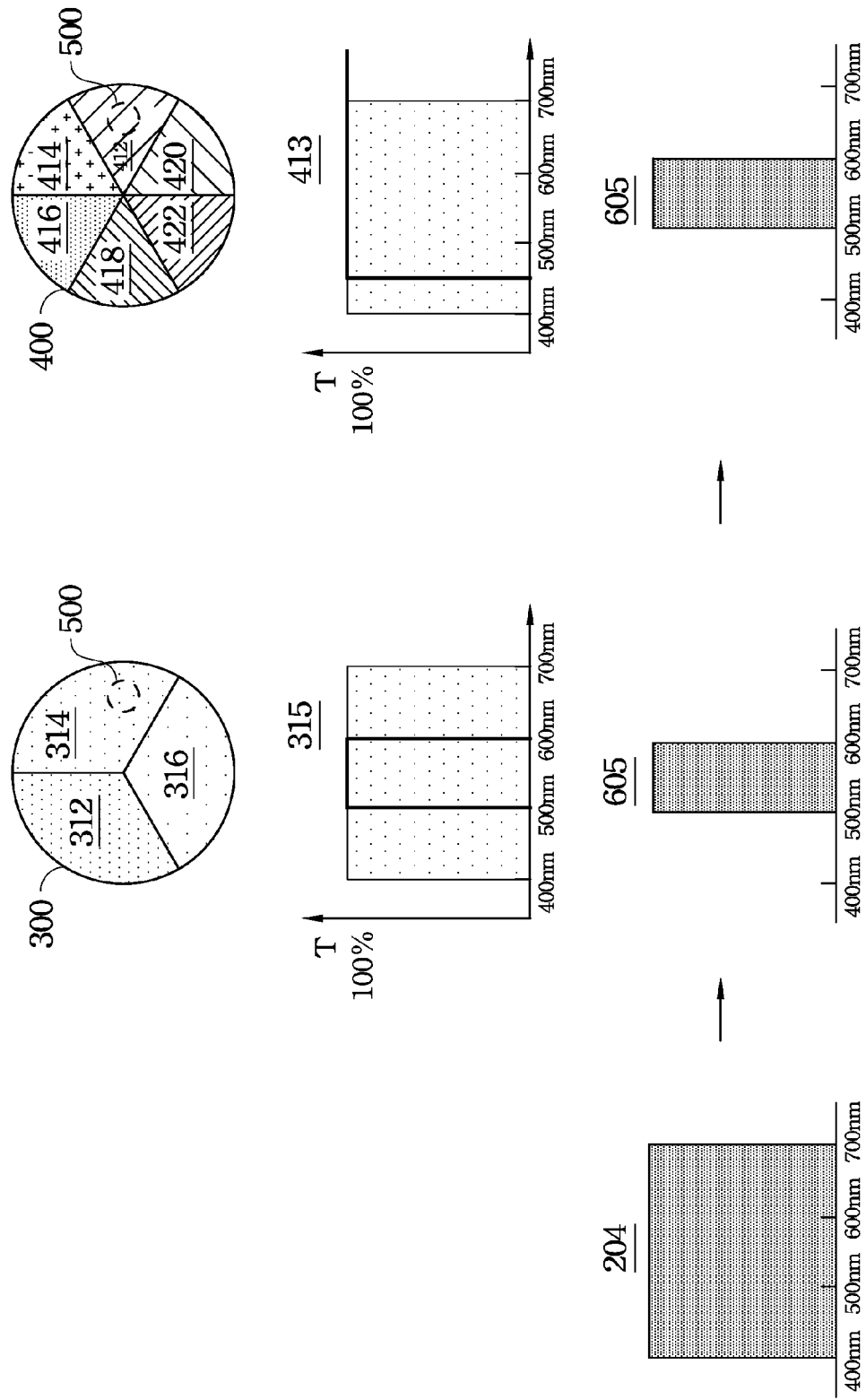

In the next time period, as shown in FIG. 16, the left eye blue filtering area 412 is simultaneously disposed in the light path 500 when the front segment of the green filtering area 314 is disposed in the light path 500. Therefore, the light beam 204 is filtered to be the green light beam with the green wavelength range 605 after passing through the green filtering area 313. Then, the green light beam with the green wavelength range 605 passes through the left eye blue filtering area 412 of the second color wheel 400 and remains its green wavelength range 605 since the left eye blue filtering area 412 has substantially no filtering effect to the green light beam with the green wavelength range 605.

Figure 17:
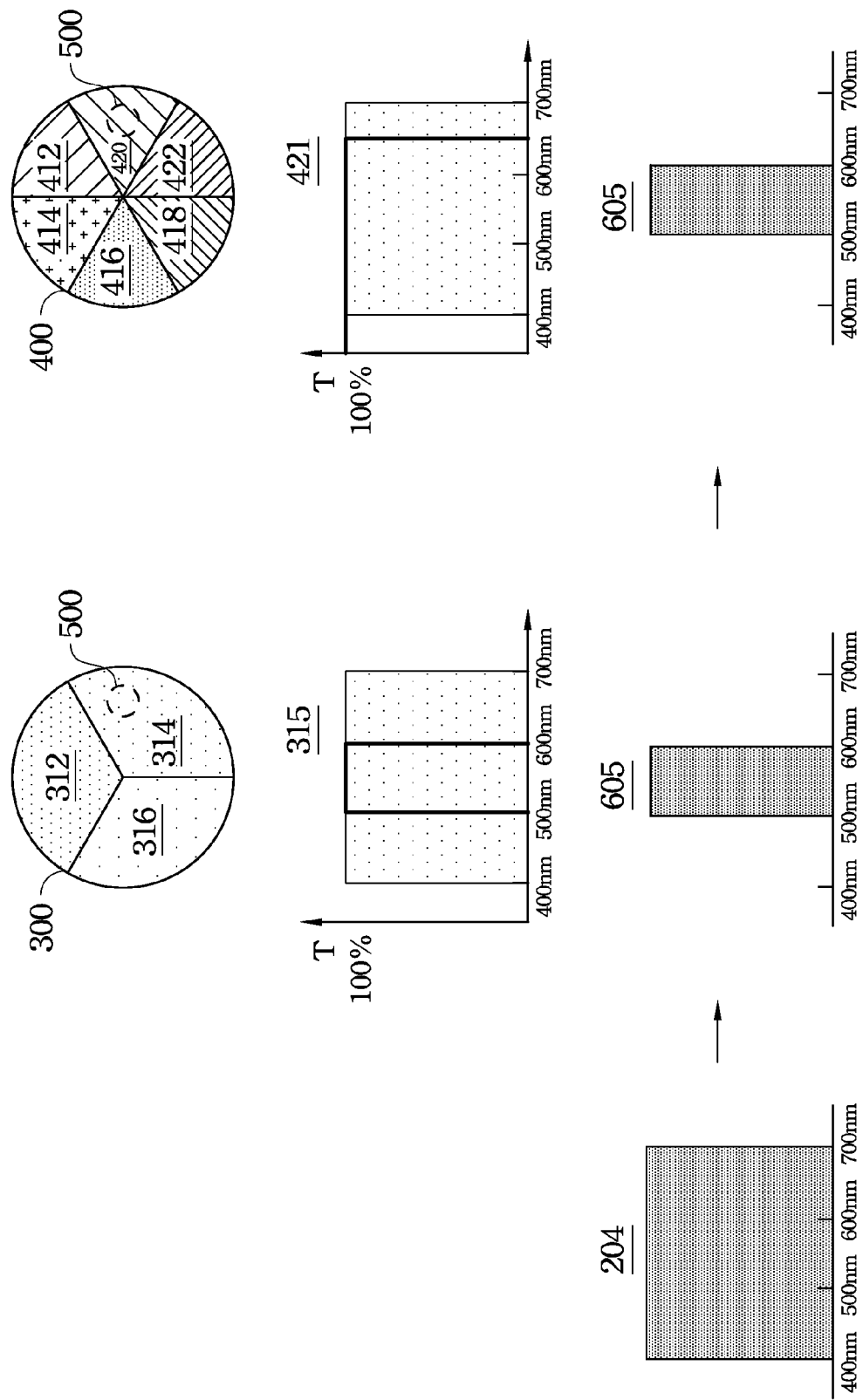

In the next time period, as shown in FIG. 17, the left eye red filtering area 420 is simultaneously disposed in the light path 500 when the rear segment of the green filtering area 314 is disposed in the light path 500. Therefore, the light beam 204 is filtered to be the green light beam with the green wavelength range 605 after passing through the green filtering area 314. Then, the green light beam with the green wavelength range 605 passes through the left eye red filtering area 420 of the second color wheel 400 and remains its green wavelength range 605 since the left eye red filtering area 420 has substantially no filtering effect to the green light beam with the green wavelength range 605.

Figure 18:
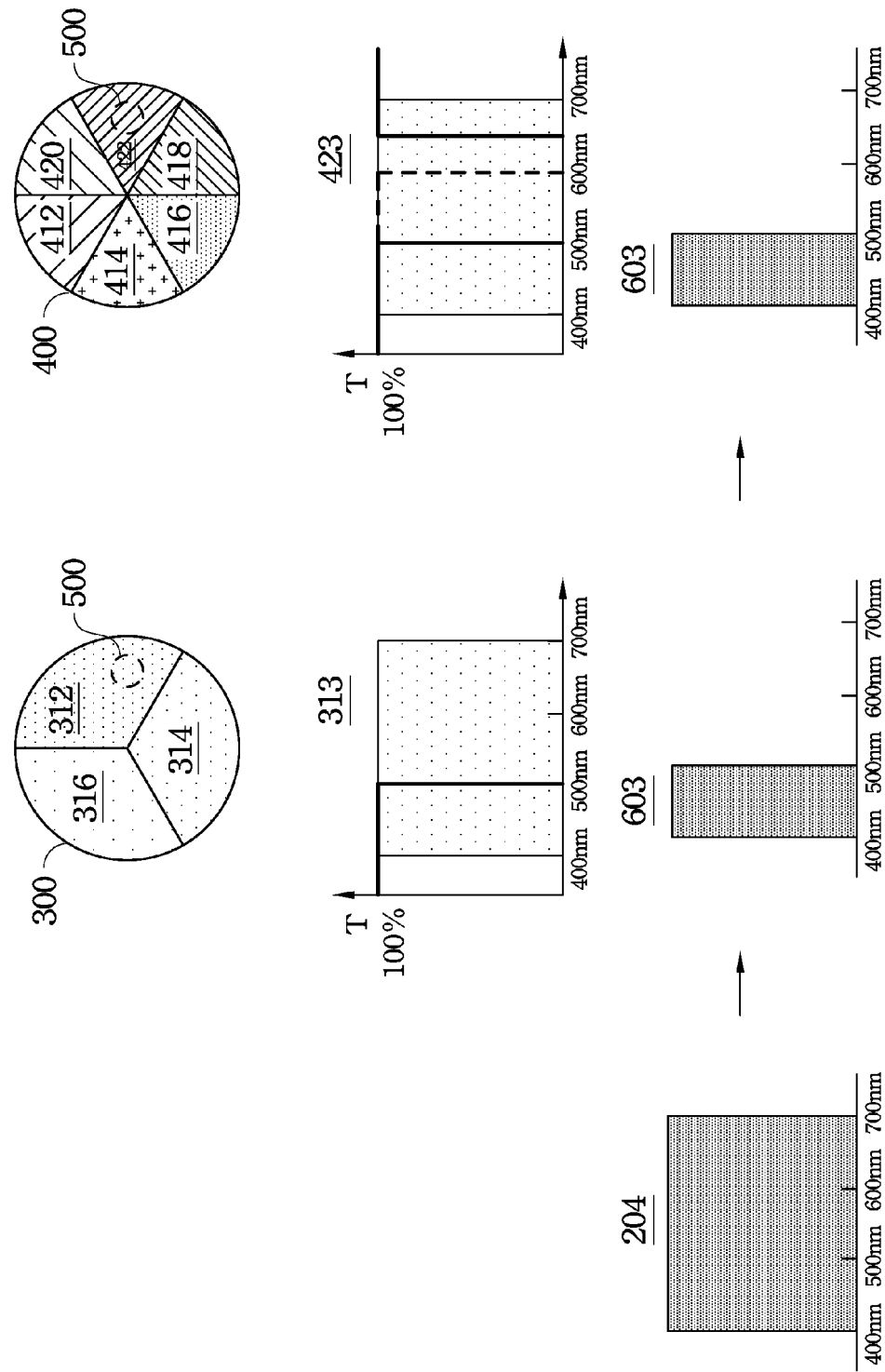

In the next time period, as shown in FIG. 18, the right eye red filtering area 422 is simultaneously disposed in the light path 500 when the front segment of the blue filtering area 312 is disposed in the light path 500. Therefore, the light beam 204 is filtered to be the blue light beam with the blue wavelength range 603 after passing through the blue filtering area 312. Then, the blue light beam with the blue wavelength range 603 passes through the right eye red filtering area 422 of the second color wheel 400 and remains its blue wavelength range 603 since the right eye red filtering area 422 has substantially no filtering effect to the blue light beam with the blue wavelength range 603.

Figure 19:
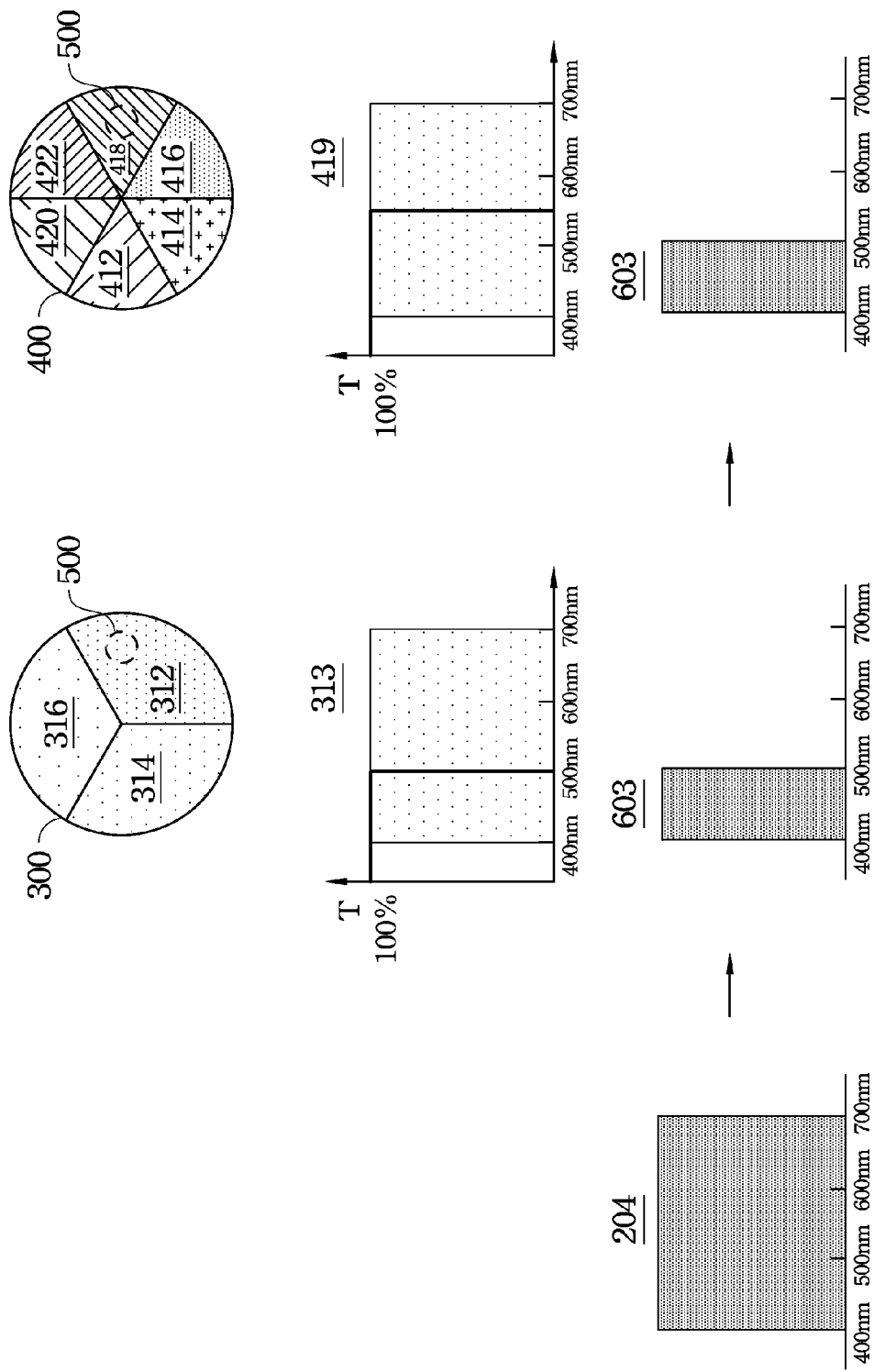

In the next time period, as shown in FIG. 19, the right eye green filtering area 418 is simultaneously disposed in the light path 500 when the rear segment of the blue filtering area 312 is disposed in the light path 500. Therefore, the light beam 204 is filtered to be the blue light beam with the blue wavelength range 603 after passing through the blue filtering area 312. Then, the blue light beam with the blue wavelength range 603 passes through the right eye green filtering area 418 of the second color wheel 400 and remains its blue wavelength range 603 since the right eye green filtering area 418 has substantially no filtering effect to the blue light beam with the blue wavelength range 603.

It should be understood that the foregoing relative arrangement of the first color wheel 300 and the second color wheel 400 is illustrative only and should not limit the scope of the claimed invention. The relative arrangement of the first color wheel 300 and the second color wheel 400 may be changed as long as the left or right eye filtering area in the light path 500 has no further filtering effect relative to the primary-color filtering area in the light path 500 at the same time. For example, since the left eye green filtering area 416, the left eye blue filtering area 412, and the right eye blue filtering area 414 have substantially no further filtering effect relative to the red filtering area 316, the left eye green filtering area 416, the left eye blue filtering area 412, and the right eye blue filtering area 414 can be disposed simultaneously in the light path 500 with the red filtering area 316 in the two-dimensional display mode. Similarly, since the left eye blue filtering area 412, the right eye blue filtering area 414 (if the right eye blue filtering area 414 allows light with a wavelength range below 450 nm and above 500 nm to pass therethrough), the left eye red filtering area 420, and the right eye red filtering area 422 (if the right eye red filtering area 422 allows light with a wavelength range above 650 nm and below 600 nm to pass therethrough) have substantially no further filtering effect relative to the green filtering area 314, the left eye blue filtering area 412, the right eye blue filtering area 414 (if the right eye blue filtering area 414 allows light with a wavelength range below 450 nm and above 500 nm to pass therethrough), the left eye red filtering area 420, and the right eye red filtering area 422 (if the right eye red filtering area 422 allows light with a wavelength range above 650 nm and below 600 nm to pass therethrough) can be disposed simultaneously in the light path 500 with the green filtering area 314 in the two-dimensional display mode. In addition, since the right eye green filtering area 418, the right eye red filtering area 422, and the left eye red filtering area 420 have substantially no further filtering effect relative to the blue filtering area 312, the right eye green filtering area 418, the right eye red filtering area 422, and the left eye red filtering area 420 can be disposed simultaneously in the light path 500 with the blue filtering area 312 in the two-dimensional display mode.

Reference is made back to FIG. 1. The light beam 204 can be filtered to be primary-color light beams with different spectra by repeating the steps from FIG. 14 to FIG. 19. The primary-color light beams are then guided to the light modulator 250 which can modulate the primary-color light beams to primary-color images according to different image data. The primary-color images can pass through the projection element 260 and then be projected onto the screen 270 to show two-dimensional images, i.e. image 265.

Figure 20:
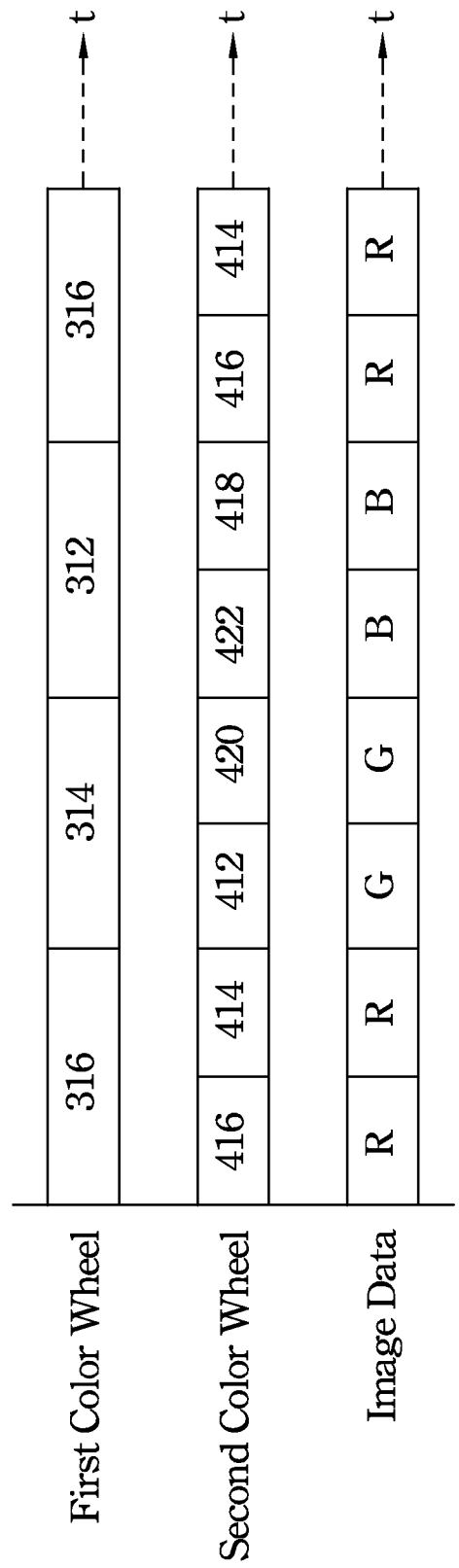
FIG. 20 is an operation sequence diagram of the first color wheel, the second color wheel, and the light modulator of FIG. 1 in the two-dimensional display mode.

FIG. 20 is an operation sequence diagram of the first color wheel 300, the second color wheel 400, and the light modulator 250 of FIG. 1 in the two-dimensional display mode. As shown in FIG. 20, the light beam 204 passing through the red filtering area 316 of the first color wheel 300 and the left eye green filtering area 416 of the second color wheel 400 is filtered to be the red light beam. The modulator 250 then modulates the red light beam to be the red image according to red image data R. In the next time period, the light beam 204 passing through the red filtering area 316 of the first color wheel 300 and the right eye blue filtering area 414 of the second color wheel 400 is filtered to be the red light beam. The modulator 250 then modulates the red light beam to be the red image according to red image data R. In the next time period, the light beam 204 passing through the green filtering area 314 of the first color wheel 300 and the left eye blue filtering area 412 of the second color wheel 400 is filtered to be the green light beam. The modulator 250 then modulates the green light beam to be the green image according to green image data G. In the next time period, the light beam 204 passing through the green filtering area 314 of the first color wheel 300 and the left eye red filtering area 420 of the second color wheel 400 is filtered to be the green light beam. The modulator 250 then modulates the green light beam to be the green image according to green image data G. In the next time period, the light beam 204 passing through the blue filtering area 312 of the first color wheel 300 and the right eye red filtering area 422 of the second color wheel 400 is filtered to be the blue light beam. The modulator 250 then modulates the blue light beam to be the blue image according to blue image data B. In the next time period, the light beam 204 passing through the blue filtering area 312 of the first color wheel 300 and the right eye green filtering area 418 of the second color wheel 400 is filtered to be the blue light beam. The modulator 250 then modulates the blue light beam to be the blue image according to blue image data B.

Therefore, as long as the first color wheel 300 and the second color wheel 400 rotate repeatedly as mentioned above with specific image data modulated by the light modulator 250, the display 200 will project primary-color images continuously.

In summary, in this embodiment, since the left or right eye filtering area in the light path 500 has substantially no further filtering effect relative to the primary-color filtering area simultaneously in the light path 500, the luminous flux passing through the first color wheel 300 and the second color wheel 400 may reach a maximum so as to improve the brightness decay occurring in the traditional display.

It should be understood that "substantially" can be used to modify any representation which could permissibly vary without resulting in a change in the basic function to which it is related. For example, the description of "the left or right eye filtering area in the light path 500 has substantially no further filtering effect relative to the primary-color filtering area simultaneously in the light path 500" not only represents that the left or right eye filtering area in the light path 500 indeed has no further filtering effect relative to the primary-color filtering area simultaneously in the light path 500 but represents that the left or right eye filtering area in the light path 500 has a slightly filtering effect relative to the primary-color filtering area simultaneously in the light path 500 as long as the display 200 can substantially provide primary-color light beams. In this context, the second color wheel 400 is considered to have substantially no filtering effect if the second color wheel 400 has no filtering effect to over 50% of light in one rotational period of the first color wheel 300 and the second color wheel 400.

Figure 21A:
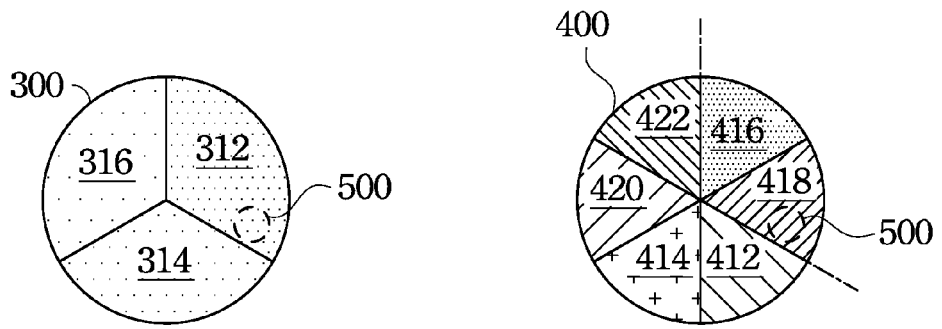
FIG. 21A to FIG. 21D show a white balance adjustment using a white balance adjustment module according to one embodiment of present invention.
Figure 21B:
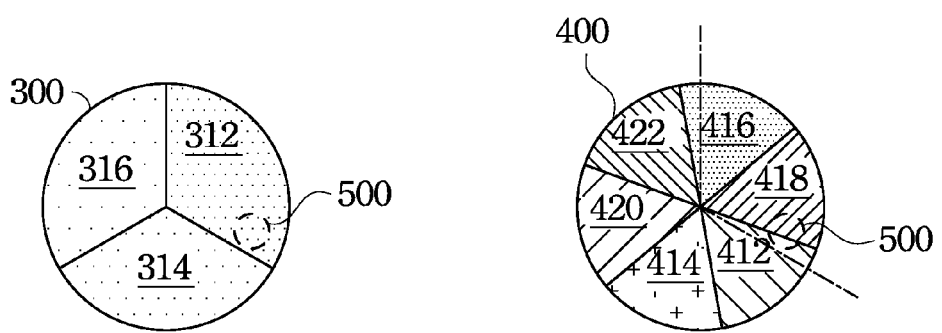
Figure 21C:
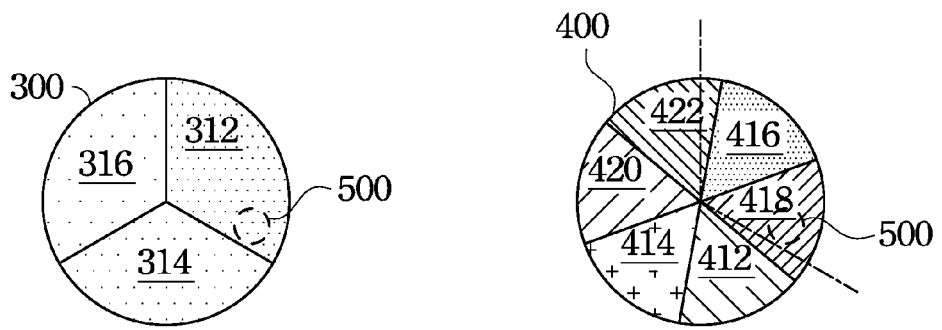
Figure 21D:
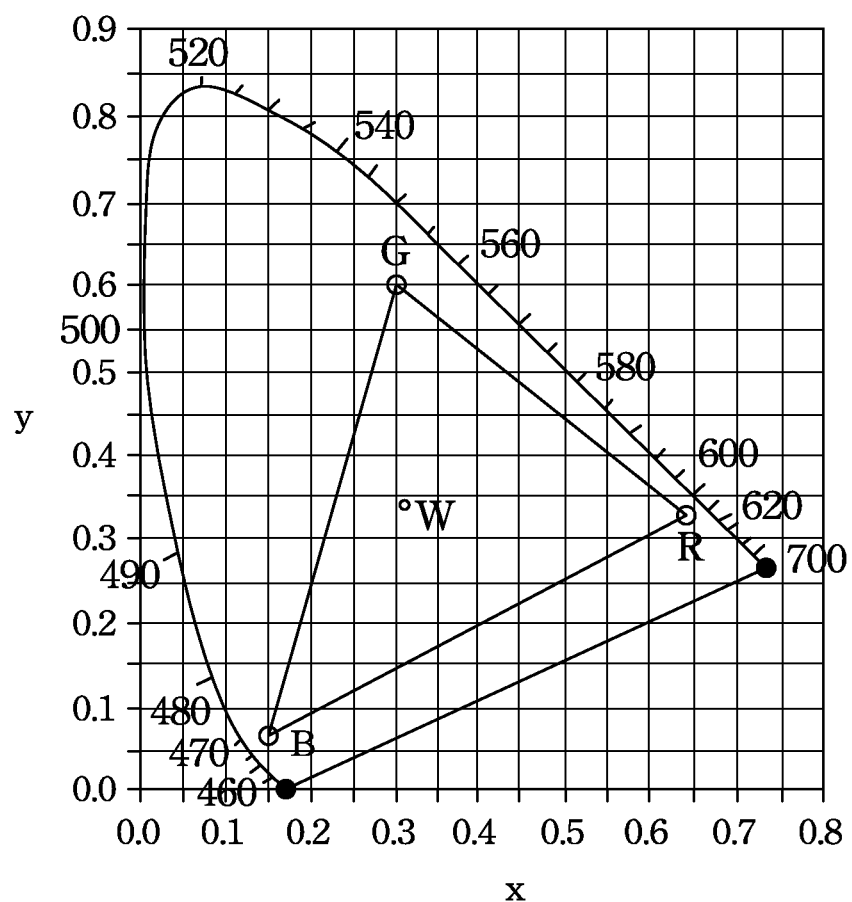

Reference is made back to FIG. 1. The display 200 may further include a white balance adjustment module 238 for adjusting the white balance of the image by rotating the second color wheel 400 with a phase lead or a phase delay in the two-dimensional display mode. FIG. 21A to FIG. 21D show a white balance adjustment using a white balance adjustment module according to one embodiment of present invention, wherein FIG. 21A to FIG. 21C show relative positions of the first color wheel 300 and the second color wheel 400 in the two-dimensional display mode, and FIG. 21D is a color gamut diagram of the image 265 in the two-dimensional display mode. FIG. 21A show the relative position of the first color wheel 300 and the second color wheel 400 in a time period before the white balance adjustment. The blue filtering area 312 of the first color wheel 300 and the right eye green filtering area 418 of the second color wheel 400 are disposed in the light path 500 simultaneously. Therefore, the light beam passing through the first color wheel 300 and the second color wheel 400 is filtered to be a blue light beam, and the color of the blue light beam is located at the point B of FIG. 21D.

For adjusting the white balance of the image, the white balance adjustment module 238 can change the phase difference between the first color wheel 300 and the second color wheel 400 to change the color of a portion of the light beam passing through the first color wheel 300 and the second color wheel 400. As shown in FIG. 21B, since the white balance adjustment module 238 changes the phase difference between the first color wheel 300 and the second color wheel 400, the light spot marked as the light path 500 hits on the second color wheel 400 shifts toward the left eye blue filtering area 412 after passing through the front segment of the blue filtering area 312. Therefore, a portion of the light beam passing through the blue filtering area 312 passes through the left eye blue filtering area 412, such that this portion of the light beam becomes bluer due to the filtering effect of the left eye blue filtering area 412, and thus the point B of FIG. 21D shifts to a bluer position to adjust the white balance of the image, that is, the color temperature of the image is raised. Of course, the foregoing adjustment is illustrative only and should not limit the scope of the claimed invention. The person having ordinary skill in the art may adjust the phase difference of the first color wheel 300 and the second color wheel 400 in other directions, as shown in FIG. 21C, to achieve the white balance adjustment according to actual requirements.

Figure 22A:
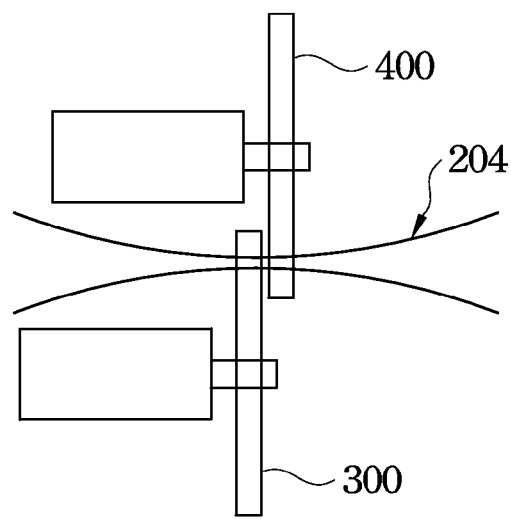
FIG. 22A to FIG. 22C show relative locations of the first color wheel and the second color wheel according to some embodiments of present invention.
Figure 22B:
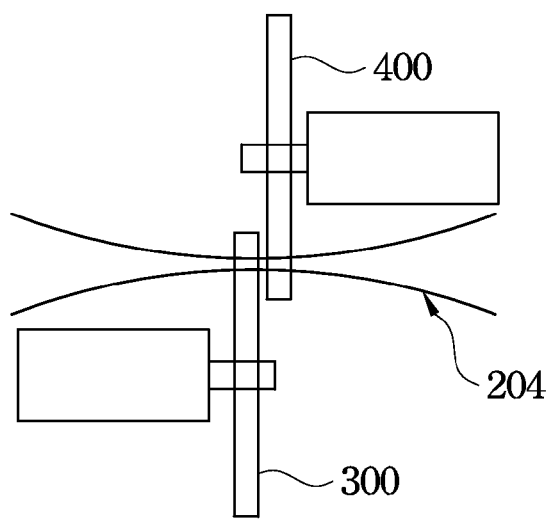
Figure 22C:
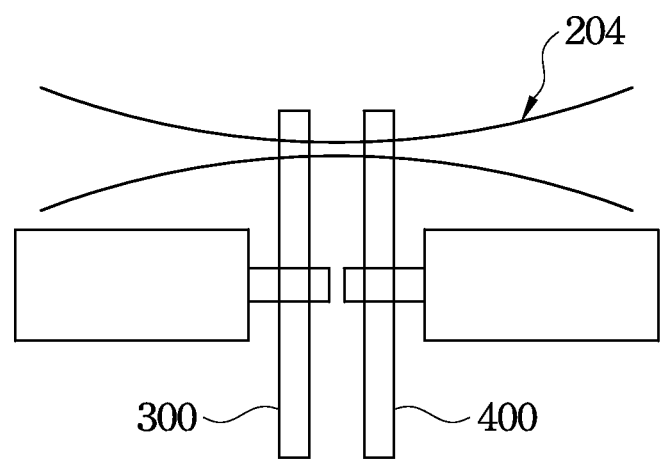

FIG. 22A to FIG. 22C show relative locations of the first color wheel 300 and the second color wheel 400 according to some embodiments of present invention. In FIG. 22A, the first color wheel 300 and the second color wheel 400 may be disposed along different axes and toward the same direction. In FIG. 22B, the first color wheel 300 and the second color wheel 400 may be disposed along different axes and toward different directions. In FIG. 22C, the first color wheel 300 and the second color wheel 400 may be disposed along the same axis and toward different directions. It should be understood that the relative locations of the first color wheel 300 and the second color wheel 400 are illustrative only and should not limit the scope of the claimed invention. The person having ordinary skill in the art may design the arrangement of the first color wheel 300 and the second color wheel 400 according to actual requirements.

When the first color wheel 300 and the second color wheel 400 rotate, the filtered light beam may be impure if the light beam 204 hits on the boundaries between two filtering areas. The affect time of the impure light depends on the light spot size hit on the color wheels. The time that the light beam 204 hit on the boundaries between two filtering areas is longer if the light spot size is larger. Although the impure light may be blocked by barriers disposed in the light path, the barriers reduce the brightness of the image as well. Therefore, the spot size of the light beam 204 hit on the color wheel should be reduced in order to reduce the impure light. In this embodiment, the focus point of the light beam 204 may be disposed between the first color wheel 300 and the second color wheel 400 for reducing the light spot size. However, since the light spot size becomes larger away from the focus point, the gap between the first color wheel 300 and the second color wheel 400 should be narrow to reduce the light spot sizes hit on the color wheels.

Therefore, in one or more embodiments, the display may be arranged as shown in FIG. 22A or 22B for reducing the gap between the first color wheel 300 and the second color wheel 400 since the gap between the first color wheel 300 and the second color wheel 400 shown in FIG. 22A or 22B does not need to accommodate the cores of the first color wheel 300 and the second color wheel 400. For example, in one or more embodiments, the gap between the first color wheel 300 and the second color wheel 400 may be smaller than 1 mm.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for displaying, comprising:
providing a light beam having a light path;
rotating a first color wheel with plural primary-color filtering areas and a second color wheel with plural left or right eye filtering areas in a three-dimensional display mode, wherein each of the primary-color filtering areas has a primary-color passband, each of the primary-color filtering areas corresponds to at least two of the left or right eye filtering areas, each of the left or right eye filtering areas filters out a portion of the primary-color passband of the corresponded primary-color filtering area, the primary-color filtering areas and the corresponding left or right eye filtering areas are disposed in the light path in sequence when the first color wheel and the second color wheel rotate, and the primary-color filtering area and the left or right eye filtering area that are simultaneously in the light path overlap, such that the light beam passing through the first color wheel and the second color wheel is filtered to plural left or right eye primary-color light beams with different spectra; and
modulating the left or right eye primary-color light beams and projecting the modulated left or right eye primary-color light beams onto a screen to display an image.

2. The method of claim 1, further comprising:
switching the rotations of the first color wheel and the second color wheel in a two-dimensional display mode, such that the left or right eye filtering area disposed in the light path has substantially no filtering effect relative to the primary-color filtering area disposed in the light path at the same time.

3. The method of claim 2, further comprising:
adjusting a phase difference between the first color wheel and the second wheel for adjusting a white balance of the image.

4. The method of claim 1, wherein one of the at least two of the left or right eye filtering areas filters out fore 50% of the primary-color passband of the corresponded primary-color filtering area, and another of the at least two of the left or right eye filtering areas filters out rear 50% of the primary-color passband of the corresponded primary-color filtering area.

5. The method of claim 1, wherein one of the at least two of the left or right eye filtering areas filters out middle 50% of the primary-color passband of the corresponded primary-color filtering area, and another of the at least two of the left or right eye filtering areas filters out fore 25% of the primary-color passband of the corresponded primary-color filtering area and rear 25% of the primary-color passband of the corresponded primary-color filtering area.

6. The method of claim 1, wherein the step of rotating the first color wheel and the second color wheel comprises:
rotating the first color wheel and the second color wheel along a same axis.

7. The method of claim 1, wherein the step of rotating the first color wheel and the second color wheel comprises:
rotating the first color wheel and the second color wheel along different axes.

8. The method of claim 1, wherein the step of rotating the first color wheel and the second color wheel comprises:
rotating the first color wheel and the second color wheel along a same direction.

9. The method of claim 1, wherein the step of rotating the first color wheel and the second color wheel comprises:
rotating the first color wheel and the second color wheel along different directions.

10. The method of claim 1, wherein the light beam passes the first color wheel first and then passes the second color wheel when the light beam passes through the first color wheel and the second color wheel.

11. The method of claim 1, wherein the light beam passes the second color wheel first and then passes the first color wheel when the light beam passes through the first color wheel and the second color wheel.

12. A display, comprising:
a light source for providing a light beam having a light path;
a first color wheel with plural primary-color filtering areas, each of the primary-color filtering areas having a primary-color passband;
a second color wheel with plural left or right eye filtering areas, each of the primary-color filtering area corresponding to at least two of the left or right eye filtering areas, each of the left or right eye filtering areas filtering out a portion of the primary-color passband of the corresponded primary-color filtering area;
an actuator for rotating the first color wheel and the second color wheel;
a controller for controlling the rotations of the first color wheel and the second color wheel, such that the primary-color filtering areas and the corresponding left or right eye filtering areas are disposed in the light path in sequence when the first color wheel and the second color wheel rotate, and the primary-color filtering area and the left or right eye filtering area that are simultaneously in the light path overlap, and thus the light beam passing through the first color wheel and the second color wheel is filtered to plural left or right eye primary-color light beams with different spectra; and
a light modulator for modulating the left or right primary-color light beams and projecting the modulated left or right primary-color light beams onto a screen to display an image.

13. The display of claim 12, further comprising:
a switch for switching the rotations of the first color wheel and the second color wheel in a two-dimensional display mode, such that the left or right eye filtering area disposed in the light path has substantially no filtering effect relative to the primary-color filtering area disposed in the light path at the same time.

14. The display of claim 13, further comprising:
a white balance adjustment module for adjusting a phase difference between the first color wheel and the second wheel to adjust a white balance of the image.

15. The method of claim 12, wherein one of the at least two of the left or right eye filtering areas filters out fore 50% of the primary-color passband of the corresponded primary-color filtering area, and another of the at least two of the left or right eye filtering areas filters out rear 50% of the primary-color passband of the corresponded primary-color filtering area.

16. The display of claim 12, wherein one of the at least two of the left or right eye filtering areas filters out middle 50% of the primary-color passband of the corresponded primary-color filtering area, and another of the at least two of the left or right eye filtering areas filters out fore 25% of the primary-color passband of the corresponded primary-color filtering area and rear 25% of the primary-color passband of the corresponded primary-color filtering area.

17. The display of claim 12, wherein the actuator is for rotating the first color wheel and the second color wheel along a same axis.

18. The display of claim 12, wherein the actuator is for rotating the first color wheel and the second color wheel along different axes.

19. The display of claim 12, wherein the first color wheel is disposed between the light source and the second color wheel.

20. The display of claim 12, wherein the second color wheel is disposed between the light source and the first color wheel.

* * * * *